United States Patent [19]
Shichiku et al.

[11] Patent Number: 5,590,355
[45] Date of Patent: Dec. 31, 1996

[54] DATA DRIVEN PROCESSOR, A DATA DRIVEN INFORMATION PROCESSING DEVICE, AND A METHOD OF VERIFYING PATH CONNECTIONS OF A PLURALITY OF DATA DRIVEN PROCESSORS IN SUCH A DATA DRIVEN INFORMATION PROCESSING DEVICE

[75] Inventors: Ricardo T. Shichiku, Tenri; Shinichi Yoshida, Kashihara; Tsuyoshi Muramatsu, Tenri; Manabu Onozaki, Nara; Yasuhiro Matsuura, Kitakatsuragi-gun, all of Japan

[73] Assignee: Sharp Kabushiki Kaisha, Osaka-fu, Japan

[21] Appl. No.: 287,919

[22] Filed: Aug. 9, 1994

[30] Foreign Application Priority Data

Aug. 11, 1993 [JP] Japan .................................. 5-199766
Mar. 25, 1994 [JP] Japan .................................. 6-055641

[51] Int. Cl.$^6$ ....................................................... G06F 13/00
[52] U.S. Cl. .............. 395/800; 395/183.06; 364/DIG. 1; 364/229; 364/232.22
[58] Field of Search ..................................... 395/800, 200, 395/162–163, 200.1, 858, 311, 183.01, 183.06; 371/13, 17, 22.1, 183.01, 183.06; 370/60, 94.1, 14, 16

[56] References Cited

U.S. PATENT DOCUMENTS

| | | | |
|---|---|---|---|
| 4,430,702 | 2/1984 | Schiebe et al. | 395/309 |
| 4,455,605 | 6/1984 | Cormier et al. | 395/858 |
| 4,500,985 | 2/1985 | Chong | 370/14 |
| 4,543,651 | 9/1985 | Chong | 370/16 |
| 5,271,000 | 12/1993 | Engbersen et al. | 370/13 |
| 5,327,125 | 7/1994 | Iwase et al. | 341/61 |
| 5,341,507 | 8/1994 | Terada et al. | 395/800 |
| 5,404,558 | 4/1995 | Okamoto | 395/800 |

*Primary Examiner*—Mehmet B. Geckil

[57] ABSTRACT

A data driven processor includes an H register storing output destination information in path connection verification, and a circuit for selectively providing a data packet to one of a plurality of output ports according to a path verification flag and destination information included in an input data packet and the contents of the H register. The processor 250 may further include a circuit for applying a data packet to an image memory unit according to a path verification flag included in the input data packet and the contents of the H register, and a circuit for directly providing to the output processing unit a data packet for testing returned from an image memory unit according to the path verification flag thereof. A data driven information processing device including a plurality of data driven processors and a method of verifying a path connection in this data driven information processing device are also disclosed.

12 Claims, 17 Drawing Sheets

TEST PATH 1

TEST PATH 2

TEST PATH 2

TEST PATH 2

DATA DRIVEN PROCESSOR, A DATA DRIVEN INFORMATION PROCESSING DEVICE, AND A METHOD OF VERIFYING PATH CONNECTIONS OF A PLURALITY OF DATA DRIVEN PROCESSORS IN SUCH A DATA DRIVEN INFORMATION PROCESSING DEVICE

BACKGROUND OF THE INVENTION

1. Field of the Invention

The present invention relates to a data driven information processing device including a plurality of data driven processors, and a plurality of memory devices connected thereto. Particularly, the present invention relates to a method for verifying whether the paths between processors and the path between a processor and an image memory which is included as a memory device are properly connected, and a data driven processor for image processing and a data driven information processing device including such data driven processors suitable for that method.

2. Description of the Related Art

FIG. 1 shows a structure of the portion relating to one data driven processor of a conventional data driven information processing device for image processing, which is an example of a data driven information processing device. A similar system configuration example is disclosed in "An Evaluation of Parallel-Processing in the Dynamic Data-Driven Processor" (*Proceedings on Microcomputer Architecture Symposium*, Hiroshi Kanekura and Souichi Miyata, Japanese Society of Information Processing Engineers of Japan, Nov. 12, 1991).

Referring to FIG. 1, the data driven information processing device includes a data driven processor 10 and an image memory unit 12.

Data driven processor 10 includes input ports IA and IB connected to data transmission paths 14 and 16, respectively, output ports OA and OB connected to data transmission paths 18 and 20, respectively, an output port OV connected to a data transmission path 22 to image memory unit 12, and an input port IV connected to a data transmission path 24 from image memory unit 12. The detailed structure of data driven processor 10 will be described afterwards. Data transmission paths 14, 16, 18, 20, 22, and 24 are paths for transmitting data packets. The configuration of a data packet will be described afterwards.

Image memory unit 12 includes a memory interface 30 and an image memory 32. Memory interface 30 and image memory 32 are connected to each other via a memory access control line 34.

Memory interface 30 includes an input port connected to data transmission path 22 and an output port connected to data transmission path 24. Memory interface 30 serves to access image memory 32 in response to an access request applied from processor 10 in the form of a data packet. Memory interface 30 updates the contents of image memory 32, or reads out the contents of image memory 32 and returns the result as a data packet to processor 10 via transmission path 24.

The data driven information processing device of FIG. 1 operates as follows. An input packet is applied to data driven processor 10 from data transmission path 14 or 16 via input port IA or IB. This input packet having a configuration which will be described afterwards includes a generation number which is allocated according to the input time sequence. Data driven processor 10 for image processing has prestored preselected processing scheme. Data driven processor 10 carries out a process on an input data packet according to the scheme.

If access to image memory 32 (reference/update or the like on the contents of the image memory) is required in the process of the input packet, data driven processor 10 transmits a data packet through data transmission path 22 to carry out an access request to memory interface 30.

Memory interface 30 accesses image memory 32 through memory access control line 34. Memory interface 30 returns the result of access to data driven processor 10 by applying the resultant data packet to input port IV of data driven type processor 10 via data transmission line 24.

Data driven processor 10 for image processing provides an output packet to one of data transmission paths 18 and 20 via either output port OA or OB when the process on the input packet ends.

FIG. 2 shows the field configuration of a data packet 40 provided from data driven processor 10 to memory interface 30 via data transmission path 22. Referring to FIG. 2, data packet 40 includes an instruction code 42 of 8 bits, a generation number 44 of 24 bits, first data 46 of 12 bits, second data 48 of 12 bits, and a processor number 50 of 10 bits.

Instruction code 42 indicates the processing contents on image memory 32, such as reference or update of the contents of the image memory.

Generation number 44 is an identifier given to a data packet at the time it is applied to data driven processor 10 through data transmission path 14 or 16 (refer to FIG. 1) to form a time series according to the input sequence of data packets. The contents of this generation number 40 is used in data matching in data driven processor 10 for image processing (refer to FIG. 1). The generation number also serves as an address for the image memory with respect to memory interface 30 (FIG. 1). In accessing image memory 32, an address in image memory 32 to be accessed is determined according to generation number 44.

The meaning of first data 46 and second data 48 is determined according to the contents of instruction code 42. For example, when instruction code 42 indicates update of the contents of image memory 32, first data 46 is the data to be written into image memory 32, and second data 48 has no meaning. When instruction code 42 indicates reference to the contents of image memory 32, first and second data 46 and 48 both have no meaning.

Processor number 50 is data for specifying a particular data driven processor 10 out of a plurality of data driven processors. Data driven processor 10 carries out a process determined by instruction code 42 on data packet 40 when processor number 50 in data packet 40 applied via data transmission path 14 or 16 matches its own allocated processor number. When processor number 50 does not match its own allocated processor number, data driven processor 10 directly outputs the data packet through either output port OA or OB according to a scheme described afterwards.

FIG. 3 shows the field configuration of a data packet 60 returned to data driven processor 10 from memory interface 30 (refer to FIG. 1) via data transmission path 24. The field configuration of data packet 60 is identical to that of the data packets transmitted through data transmission paths 14, 16, 18 and 20 shown in FIG. 1.

In FIG. 3, instruction code 62, generation number 64, and processor number 68 are similar to instruction code 42, generation number 44, and processor number 50 shown in FIG. 2. First data 66 contains 12 bits. Data indicating the result may be stored in first data 66 depending upon the type of processing on image memory 32.

FIG. 4 is a block diagram of a data driven information processing device in which four data driven processors 10 for image processing and four image memory units 12 shown in FIG. 1 are employed. Referring to FIG. 4, this data driven information processing device includes two hosts 70 and 72, and four data driven processors PE#0–PE#3 connected in a network so that each processor can be reached from another arbitrary processor. Each of data driven processors PE#0–PE#3 has a structure identical to that of data driven processor 10 of FIG. 1. Image memory units VM#0–VM#3 are connected to data driven processors PE#0–PE#3, respectively. The structure of each of image memory units VM#0–VM#3 is identical to that of memory unit 12 shown in FIG. 1. The connection between a data driven processor and a corresponding image memory unit is similar to that between data driven processor 10 and image memory unit 12 shown in FIG. 1. It is to be noted that hosts 70 and 72 may be the same unitary host. This applies to all the embodiments of the invention of the present application.

The example shown in FIG. 4 has input port IA of processor PE#0 connected to one output of host 70. The other input port IB of processor PE#0 is connected to one output port OB of processor PE#2. One output port OA of processor PE#0 is connected to one input port IA of processor PE#2. The other output port OB of processor PE#0 is connected to one input port IA of processor PE#3.

One input port IA of processor PE#1 is connected to one output port OA of processor PE#3. The other input port IB of processor PE#1 is connected to the other output port of host 70. One output port OA of processor PE#1 is connected to input port IB of processor PE#2. The other output port OB of processor PE#1 is connected to input port IB of processor PE#3.

Output port OA of processor PE#2 is connected to one input port of host 72. Output port OB of processor PE#3 is connected to the other input port of host 72.

Image memory units VM#0, VM#1, VM#2, and VM#3 are connected to processors PE#0, PE#1, PE#2, and PE#3, respectively. This manner of connection is identical to the connection between processor 10 and image memory unit 12 shown in FIG. 1.

As mentioned above, any processor can reach another arbitrary processor according to the configuration shown in FIG. 4. For example, consider a case of transmitting a packet from processor PE#0 to processor PE#1. First, the packet is provided from output port OB of processor PE#0. This packet is applied to processor PE#3 via input port IA thereof. Processor PE#3 outputs this packet at output port OA, applying the packet to input port IA of processor PE#1. The communication of a data packet between other processors is carried out in a similar manner. However, it is to be noted that each data driven processor must identify whether an applied data packet is addressed to itself, and determine an output port from which that packet is output if not addressed to itself. This is accomplished as in the following.

FIG. 5 is a block diagram showing a structure of data driven processor 10 of FIG. 1. Referring to FIG. 5, a conventional data driven processor 10 for image processing includes an input processing unit 80, a junction unit 82, a main processing unit 84, a branch unit 86, an output processing unit 88, and a PE# register 90.

Input processing unit 80 includes two data packet inputs connected to input ports IA and IB, and two data packet outputs connected to the data packet input of branch unit 82 and one data packet input of output processing unit 88, respectively. The data packet to be processed by input processing unit 80 is 54 bits long here. Input processing unit 80 determines whether the data packet applied via data transmission path 14 or 16 is addressed to this data driven processor 10, and selectively provides the data packet to junction unit 82 or output processing unit 88 according to the determination result.

PE# register 90 serves to prestore a processor number allocated to data driven processor 10. This processor number is used for data packet distribution by input processing unit 80, and data packet branching by output branch unit 86.

Junction unit 82 includes a data packet input connected to one output of input processing unit 80, a data packet input connected to one data packet output of branch unit 86, and an output connected to the data packet input of main processing unit 84. Junction unit 82 merges the data packets provided from input processing unit 80 and the data packets sent from branch unit 86, and also detects corresponding data and provides to main processing unit 84 a complete data packet with all the required data.

Main processing unit 84 includes an input connected to data transmission path 24 via input port IV, an input connected to the output of junction unit 82, an output connected to data transmission path 22 via output port OV, and an output connected to the input of branch unit 86. Main processing unit 84 has a program stored in advance. Main processing unit 84 carries out a process according to the contents of the data packet provided from junction unit 82 to provide the resultant data packet to branch unit 86. When access to image memory 32 shown in FIG. 1 is required, main processing unit 84 sends the packet to image memory unit 12 via output port OV and data transmission path 22. Main processing unit 84 receives via data transmission path 24 and input port IV a data packet from image memory unit 12 having the access result of image memory 32 stored.

Branch unit 86 includes an input connected to the output of main processing unit 84, an output connected to the other input of output processing unit 88, and an output connected to one input of junction unit 82. Branch unit 86 can refer to the contents of PE# register 90. Branch unit 86 selectively provides a data packet to branch unit 82 or output processing unit 88 according to the processor number in the provided data packet and the contents of PE# register 90.

Output processing unit 88 includes two inputs connected to one output of input processing unit 84 and one output of branch unit 86, respectively, as described before, and two outputs connected to output ports OA and OB, respectively. Output processing unit 88 selects either output port OA or OB according to the processor number included in the applied data packet and the preset branching condition to provide the data packet to the selected output port.

An operation of data driven processor 10 of FIG. 5 will be described schematically hereinafter. A data packet is applied to input processing unit 80 via data transmission path 14 or 16. Input processing unit 80 compares the contents of PE# register 90 and the processor number of the input data packet. If they match, input processing unit 80 determines that this applied data packet is addressed to this data driven processor 10, and provides this data packet to junction unit 82 via one output. If they do not match, input processing unit 80 provides this data packet directly to output processing unit 88 via the other output.

Junction unit 82 merges data packets from branch unit 86 and data packets from input processing unit 80. Junction unit 82 detects paired data, and provides the data packet that is subjectable to data processing to main processing unit 84.

Main processing unit 84 carries out a predetermined process according to the instruction code in the applied data packet and provides the resultant data packet to branch unit 86 according to a prestored program. If access to image memory 34 is required, main processing unit 84 provides the processing packet to memory interface 30 via data transmission path 22, and then receives the resultant data packet via data transmission path 24. Instruction codes requiring access to image memory 32 are defined in advance as, for example, having "1" as the most significant bit. Whether access to image memory 32 is required or not can then be identified according to whether the most significant bit of the instruction code is "1" or not.

Branch unit 86 compares the processor number in the data packet applied from main processing unit 84 with the contents of PE# register 90, and provides the data packet to junction unit 82, if they match. Otherwise, branch unit 86 provides the data packet to output processing unit 88.

Output processing unit 88 selects either output port OA or OB according to the processor number in the data packet provided from branch unit 86 or input processing unit 80, and the preset branching condition related to that processor number. Output processing unit 88 provides the data packet to the selected data packet output port.

Proper connection between data driven processors, and between a data driven processor and an image memory unit must be established by respective predetermined paths for appropriate operation in the conventional data driven information processing device of the configuration shown in FIGS. 1–5. Erroneous operation of the system may originate from improper connection of the paths. In such a case, the defective path must be identified in order to take appropriate measures. However, to carry out a process of a higher level of complexity, the system complexity must be increased by increasing the number of processors and image memory units included in the data driven information processing device. The communication paths between processors and between a processor and image memory, and the number of combinations thereof will be appreciably increased as the number of processors and image memory units are increased, resulting in difficultly in the identification of the defective paths.

The process set forth in the following was conventionally carried out in order to identify a defective path or in order to verify whether path connection was carried out properly. A case of verifying the connection path between processors PE#0 and PE#2 in the system shown in FIG. 4, for example, is considered. In this case, as shown in FIG. 6, a predetermined data packet is generated in the host, and processing 100 is carried out to be applied to the system. The instruction code of the data packet applied to the system is a NOP instruction (NO Operation), and a bit pattern of "010101010101" is set as first data 66. It is assumed that the bit pattern of a NOP instruction is "00101000". This data packet is applied to processor PE#0 via input port IA of processor PE#0, as shown in FIG. 4.

Processor PE#0 provides this data packet from output port OA to input port IA of processor PE#2. Because the instruction code is a NOP instruction, no operation is carried out on the data packet by processor PE#0.

Similarly, processor PE#2 carries out no operation on the data packet, which is applied to host 72 via output port OA.

The output of a data packet to either output port OA or OB in each processor is determined according to preset conditions set forth in the following. Each output processing unit has a memory for storing in advance the branching condition of each processor. This memory has required values set by an initialization packet prior to application of a data packet. The values to be stored in the memory of an output processing unit by an initialization packet includes a mask value and a match value. A mask value and a match value have the following meanings. A logical product is taken between the processor number of a data packet applied to the output processing unit, and a mask value stored in the memory of the output processing unit. The result of the logical product is compared with the match value stored in the memory of the output processing unit. If both values match each other, the data packet is provided to output port OA, otherwise to output port OB. The selection of an output port in the verification of path connection is carried out in a similar manner.

Referring to FIG. 6, a NOP instruction 102 is carried out in processor PE#0, and a NOP instruction 104 is carried out in processor PE#2, followed by an output process 106 to the host. Because the instruction executed is only a NOP instruction, the contents of a data packet applied to host 72 should match that of the data packet provided from host 70. If the contents do not match each other, there is a possibility of a defective path.

It is assumed, for example, that the pattern of the first data region in the data packet output from host 70 is as described above, and the bit pattern of the first data region applied to host 72 is "1101010101". In this case, there is a possibility of a short circuit between the connection path corresponding to the most significant bit of the first data, and the connection path corresponding to an adjacent bit. Similarly, when the bit pattern of an instruction code of a data packet applied to host 72 differs from the bit pattern of the instruction code of the data packet output from host 70, there is a possibility of a defective connection path corresponding to an instruction code between the processors, or between the host and the processor.

The method of verifying the connection between a processor and an image memory in FIG. 7 is substantially similar. For example, consider the case of verifying the connection path between processors PE#0 and PE#2, and image memory units VM#0 and VM#2 connected thereto. Referring to FIG. 7, a predetermined data packet is generated in the host for verifying the connection with an image memory in the host, and a process 100A is carried out to be applied to the system. The instruction code of the data packet to be applied to the system is a VNOP instruction (Video NO Operation), and the bit pattern of "010101010101" is set in first data 66. It is assumed that the bit pattern of the VNOP instruction is "11010011". This data packet is applied to processor PE#0 via input port IO thereof as shown in FIG. 4.

Processor PE#0 provides this data packet from output port OV to the input port of image memory unit VM#0. Image memory unit VM#0 provides this data packet from the output port to input port IV of processor PE#0. Because the instruction code is a VNOP instruction, image memory unit VM#0 carries out no process on the data packet.

Processor PE#0 provides this data packet from output port OA to input port IA of processor PE#2.

Similarly, processor PE#2 carries out a process 104A executing a VNOP instruction as shown in FIG. 7. More specifically, processor PE#2 provides this data packet from output port OV to the input port of image memory unit VM#2. Image memory unit VM#2 provides this data packet from the output port to input port IV of processor PE#2. Because the instruction code is a VNOP instruction here, image memory unit VM#2 carries out no operation on the data packet.

Processor PE#2 carries out no process on the data packet, which is applied to host 72 via output port OA (step 106A in FIG. 7).

The output of a data packet to either output port OA or OB in each processor is carried out according to the aforementioned conditions.

Thus, as shown in FIG. 7, output process 106A is carried out for the host after a VNOP instruction 102A is carried out in processor PE#0 and image memory unit VM#0, and a VNOP instruction 104A in processor PE#2 and image memory unit VM#2. Because the instruction executed is only a VNOP instruction, the contents of the data packet input to host 72 should match the contents of the data packet output from host 70. If the contents do not match each other, there is a possibility of a defective path.

It is assumed that, for example, the bit pattern of the first data region of the data packet output from host 70 is as described above, and the bit pattern of the first data region of the data packet received by host 72 is "1101010101". In this case, there is a possibility of a short circuit between the connection path corresponding to the most significant bit of the first data and the connection path corresponding to an adjacent bit.

Conventional verification of a proper connection path of the entire system was carried out by sequentially verifying whether each connection path is proper or not.

However, it was extremely difficult, even impossible in some cases, to completely verify the connection of all paths by such a method in a conventional data driven information processing device. This is due to the fact that it is difficult to set an arbitrary bit pattern in each field of a data packet and apply that data packet to the device.

In setting the contents of a packet for path testing, an instruction code or the like corresponding to the bit pattern to be tested was selected by searching a prespecified preset instruction set. However, the following problems were encountered.

First, an instruction code corresponding to a desired bit pattern may be or may not be included in the current instruction set. For example, in one existing system, instruction codes corresponding to the bit patterns of "01110000"–"01111111" are not available. It is not possible to process a data packet including such an instruction code in processors. Therefore, testing of a connection path using such bit patterns could not be carried out.

Even if an instruction code corresponding to a bit pattern to be tested were available, that instruction code may be or may not be applicable for path testing. The reason is set forth in the following. Each processor carries out an operation on the input data to calculate output data according to the instruction code in the applied data packet. In many cases, the output data and the input data have different values. It is then extremely difficult to verify whether this difference is the result of the operation, or the results of a defective path connection. Furthermore, some instruction codes carry out operations in which output data take different values depending, not only on the values of the data in the input data packet, but also on the contents prestored in an accumulator or the like. If a bit pattern corresponding to such an instruction code is used for path connection testing, it will be necessary to set in advance, or confirm the contents of the accumulator or the like. It will then become more difficult to verify whether the contents of the output data properly indicates the operation result, or includes an error due to a defective path connection.

There is also the case where testing with a desired bit pattern cannot be carried out in the verification of a connection path with an image memory unit. In the above-described conventional example, the most significant bit of an instruction code requiring access to an image memory unit is always "1". Therefore, if an instruction code is used having a bit pattern in which the most significant bit is "0", that data packet cannot be output to the data transmission path leading to the image memory unit. It is therefore impossible to verify the path connection between a processor and an image memory unit using such an instruction code.

An extreme case will be described hereinafter. In an existing system, the instruction code corresponding to a bit pattern of "000100000" means "Discard input packet". Further, in the above-described conventional system, instruction codes corresponding to the bit patterns of "11100000"–"11101111" among the instructions that require access to an image memory unit also correspond to the function of discarding the data packet after operation. Therefore, even if a path connection test is carried out using these bit patterns, a data packet can not be output from the processor. In this case, it is almost impossible to identify by just the above-described testing whether an output packet was not obtained as a result of a process executed properly according to an instruction code of the input data packet, or as a result of a defective path connection.

Thus, it was not possible to verify path connection using an arbitrary bit pattern since the bit pattern of an instruction code included in a data packet that can be applied to the system was subjected to constraints of factors other than testing. It was therefore extremely difficult to verify the path connection. It is desirable to facilitate path connection with respect to various connections.

SUMMARY OF THE INVENTION

An object of the present invention is to provide a data driven processor that can easily carry out verification of a path connection in a data driven information processing device irrespective of constraints imposed on the contents of a data packet for normal processing.

Another object of the present invention is to provide a data driven information processing device that can easily verify a path connection in a data driven type information processing device irrespective of constraints imposed on the contents of a data packet for normal processing, in addition to normal processing.

A further object of the present invention is to provide a data driven information processing device that can easily verify a path connection in a data driven information processing device having a connection in which an output path branches into two irrespective of constraints imposed on the contents of a data packet for normal processing.

Still another object of the present invention is to provide a data driven information processing device that can easily verify, irrespective of constraints imposed on the contents of a data packet for normal processing, a path connection in a data driven type information processing device having a connection in which an output path branches into two and including a predetermined memory device such as an image memory device.

A still further object of the present invention is to provide a data driven information processing device that can make it easy to verify, irrespective of constraints imposed on the contents of a data packet for normal processing, a path connection in the data driven information processing device having a connection where two transmission paths are merged into one, and including a predetermined memory device such as an image memory device.

Yet a further object of the present invention is to provide a data driven information processing device that can make it easy to verify, irrespective of constraints imposed on the contents of a data packet for normal processing, a path connection in the data driven information processing device having a connection in which a transmission path branches into more than 1 path, and including a predetermined memory device such as an image memory device.

Yet another object of the present invention is to provide a data driven information processing device including a plurality of data driven processors, and that can make it easy to verify a path connection between processors irrespective of constraints imposed on the contents of a data packet for normal processing.

Yet a still further object of the present invention is to provide a data driven information processing device including a plurality of data driven processors and a plurality of memory devices such as image memory devices, and that can make it easy to verify an arbitrary path connection between a processor and a memory device irrespective of constraints imposed on the contents of a data packet for normal processing.

Another object of the present invention is to provide a method of easily verifying in a data driven information processing device including a plurality of data driven processors a path connection between processors irrespective of constraints imposed on the contents of a data packet for normal processing.

A further object of the present invention is to provide a method of easily verifying in a data driven information processing device including a plurality of data driven processors and a plurality of memory devices such as image memory devices an arbitrary path connection between a processor and a memory device irrespective of constraints imposed on the contents of a data packet for normal processing.

A data driven processor of the present invention includes an input port and an output port, an output destination information memory device for storing output destination information specifying an output port from which a data packet is provided in path verification testing, and a selective output device including an input connected to the input port for selectively providing an input data packet to an output port according to a path verification flag and destination information included in the input packet and output destination information.

According to this data driven processor, output destination information specifying an output port from which a data packet is provided in path verifying testing is prestored in the output destination information memory device. The selective output device selectively provides an input data packet to an output port according to a path verification flag and destination information included in the input data packet and output destination information. By including as a path verification flag a value indicating a normal mode in a data packet, that data packet can be output to the output port selected according to the destination information in that data packet. By prestoring in the output destination information memory device the output destination information specifying an output port from which a data packet is provided in path verification testing, and including as a path verification flag a value indicating testing in the data packet, that data packet can be selectively output to a desired output port according to the output destination information irrespective of the other contents in the data packet. Verification of a path connection of a data driven processor can be carried out using a data packet of an arbitrary bit pattern. As a result, a data driven processor is provided that makes it easy to verify a path connection in the data driven information processing device irrespective of constraints imposed on the contents of the data packet for normal processing.

According to a preferred embodiment of the present invention, the data driven processor includes a plurality of output ports. The selective output device includes an input processing device, a data packet processing device, and an output processing device. The input processing device includes an input connected to an input port, and first and second outputs. The input processing device selectively provides an input data packet to either one of the first and second outputs according to a path verification flag and destination information included in the input data packet. The data packet processing device includes an input connected to a first output of the input processing device. The data packet processing device carries out a process according to the information included in the applied data packet and generates, if necessary, an output data packet, including information for specifying an output port. The output processing device includes two inputs connected to the output of the data packet processing device and the second output of the input processing device, respectively, and a plurality of outputs connected to a plurality of output ports, respectively. The output processing device is connected to the output destination information memory device, selectively refers to either output destination information or destination information included in an input data packet according to the value of the path verification flag of the input data packet, and selects one of the plurality of output ports to provide the data packet.

In this data driven processor, an input data packet for testing is directly applied to the output processing device. A normal data packet is applied to the data packet processing device to be processed, and the resultant data packet is applied to the output processing device. The output processing device refers to output destination information when the path verification flag of an input data packet indicates testing, and refers to destination information when the path verification flag of the input data packet indicates a normal operation, and selects one output port. Therefore, normal processing can be carried out for a normal data packet. As a result, a data driven information processing device is provided that can carry out normal operation as in a conventional case, and that makes it easy to verify the path connection in the data driven information processing device irrespective of constraints imposed on the contents of the data packet for normal processing.

A data driven processor according to another embodiment of the present invention includes first and second input ports. An input processing device includes a device having two inputs connected to first and second input ports, respectively, for selectively providing an input data packet to one of first and second outputs according to the path verification flag and destination information included in the input data packet.

In this data driven processor, an input data packet is selectively provided to one of the first and second outputs according to the path verification flag and destination information included in the input data packet in the input processing device. One of two paths can be selected to which a data packet is provided. As a result, a data driven information processing device is provided that makes it easy to verify path connections in the data driven information processing device having connections in which an output path branches into two, irrespective of constraints imposed on the contents of a data packet for normal processing.

According to another aspect of the present invention, a data driven information processing device includes a plurality of data driven processors, and a connection device for connecting the plurality of data driven processors with each other. Each of the plurality of data driven processors includes an input port and an output port, an output destination information memory device, and a selective output device. The connection device includes a plurality of data transmission paths for connecting an input port of respective plurality of data driven processors to an output port of another data driven processor so that there is at least one data transmission path, indirectly or directly, from an arbitrary one of the plurality of data driven processors to another arbitrary one of the plurality of data driven processors.

In this data driven information processing device, each output destination information memory device of the plurality of data driven processors has output destination information stored in advance. Each selective output device of the plurality of data driven processors selectively provides an input data packet to an output port according to the path verification flag and destination information included in the input data packet and output destination information. By the connection device, a data packet is transmitted, indirectly or directly, from an arbitrary one to another arbitrary one of the plurality of data driven processors.

By including as a path verification flag a value indicating a normal mode in the data packet, that data packet can be output to a selected output port according to the destination information in that data packet. By storing in advance output destination information specifying an output port from which a data packet is provided in path verification testing in the output destination information memory device, and including as a path verification flag a value indicating testing in the data packet, that data packet can be selectively output to a desired output port according to the output destination information irrespective of the contents of the instruction code in the data packet. Therefore, verification of connection of an arbitrary data transmission path can be carried out using a data packet of an arbitrary bit pattern. As a result, a data driven information processing device is provided that includes a plurality of data driven processors, and that makes it easy to verify path connections between processors irrespective of constraints imposed on the contents of a data packet for normal processing.

According to a further aspect of the present invention, a method of verifying path connections of a plurality of data driven processors includes: a path specifying step for respectively setting output destination information providing a desired transmission path in an output destination information memory device of the plurality of data driven processors; a data packet applying step for applying a data packet having a value indicating path verification testing set as a path verification flag to an input port of a first data driven processor in a desired transmission path; a verifying step for verifying whether a data packet properly corresponding to an applied data packet is output or not to the output port of the last data driven processor in a desired transmission path; and a step for repeatedly carrying out the path specifying step, the data packet applying step and the verifying step by varying the desired transmission path.

According to the above method, output destination information providing a desired transmission path is set in respective output destination memory devices of the plurality of data driven processors. A data packet having a value indicating path verification testing set as a path verification flag is applied to the input port of the first data driven processor in a desired transmission path. Verification is made whether a data packet properly corresponding to an applied data packet is provided or not to the output port of the last data driven processor in the desired transmission path. Then, the path specifying step, the packet applying step, and the verification step are repeated out by varying the desired transmission path.

According to this method, the connection of a desired one transmission path connecting a plurality of data driven processors can be verified, irrespective of the bit pattern of the data packet, by carrying out just once a path specifying step, a data packet applying step, and a verifying step. By repeating these steps on different transmission paths, connection thereof can be verified for all combination of data transmission paths between the plurality of data driven processors. Thus, a method is provided which makes it easy to verify path connections between processors, irrespective of constraints imposed on the contents of a data packet for normal processing, in a data driven information processing device including a plurality of data driven processors.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[Embodiment 1]

Figure 8:
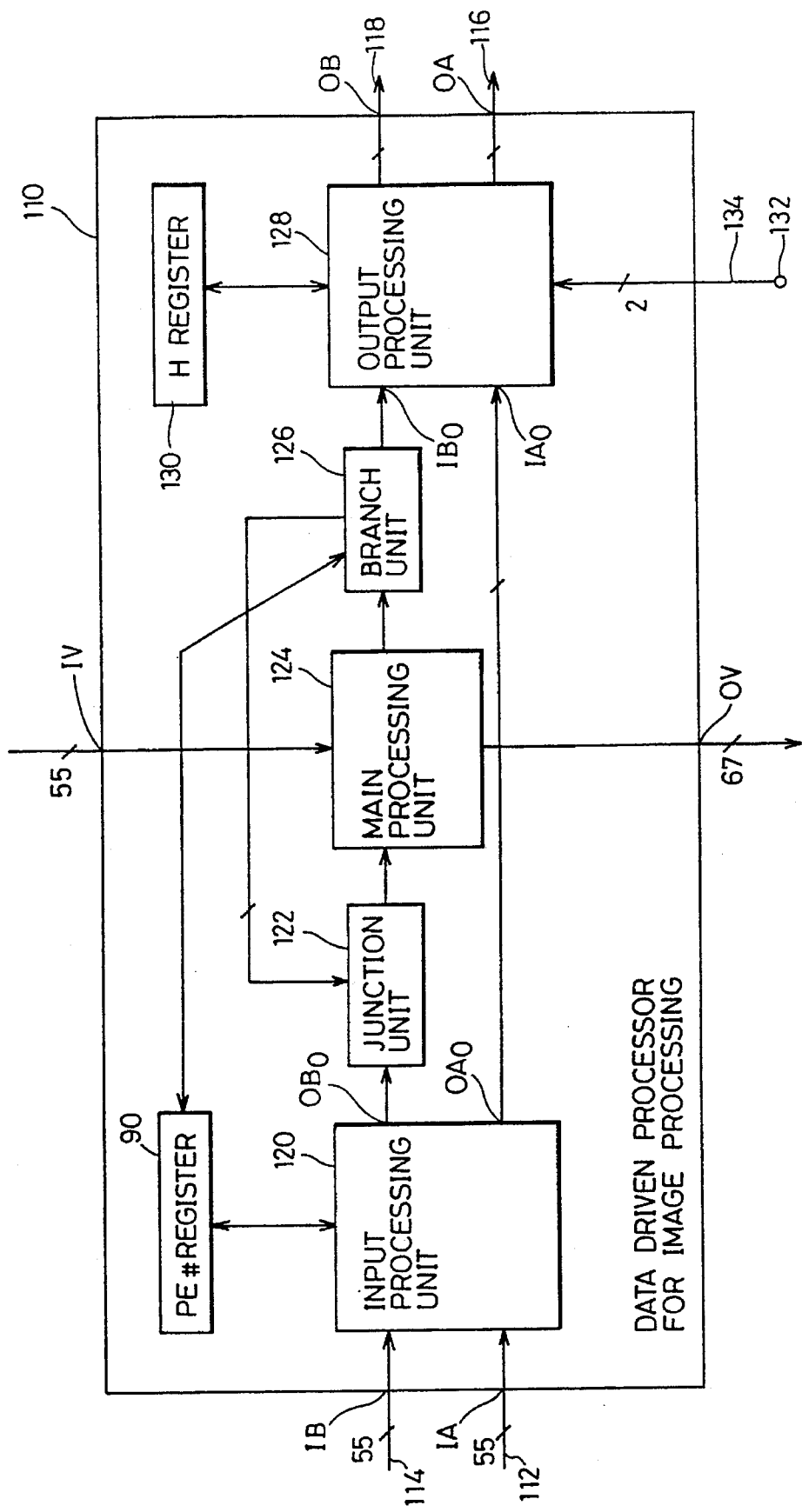
FIG. 8 is a block diagram of a data driven processor for image processing according to a first embodiment of the present invention.

FIG. 8 is a block diagram of a data driven processor for image processing according to a first embodiment of the present invention. Referring to FIG. 8, a data driven processor 11 for image processing includes an input processing unit 120, a junction unit 122, a main processing unit 124, a branch unit 126, an output processing unit 128, a PE# register 90, and an H register 130 corresponding to output destination information memory means. PE# register 90 is similar to PE# register 90 of the conventional data driven processor 10 for image processing shown in FIG. 5. The numbers of inputs and outputs of the present invention is not limited to that of the device of the present embodiment where data driven processor 110 includes two inputs and two outputs. For example, the data driven processor may include one input and a plurality of outputs, or more than two inputs and outputs. The number of inputs and outputs do not have to match each other.

Regarding data packets used by data driven processor 110 for image processing shown in FIG. 8, those used for input to an image memory unit is 67 bits long, and those used for input/output between other data driven processors are 55 bits long. These are only by way of examples, and the data packet length and the field configuration are not limited to such examples.

Input processing unit 120 includes two data packet inputs of 55 bits in length connected to two input ports IA and IB, and two data packet outputs OB0 and OA0 of 55 bits in length. Input processing unit 120 refers to the information (details described afterwards) included in an input data packet to selectively provide that data packet to junction unit 122 or output processing unit 128. Input processing unit 120 sets the contents of PE# register 90 upon receiving a particular instruction.

Junction unit 122 includes an input of 55 bits in length connected to one data packet output OB0 of input processing unit 120, an input of 55 bits in length connected to the output of branch unit 126, and a data packet output of 55 bits in length connected to main body processing unit 124. Junction unit 122 carries out a function similar to that of junction unit 82 in the conventional data driven processor 10 shown in FIG. 5. Junction units 82 and 122 differ from each other in the processing data packet length of 54 bits and 55 bits, respectively.

Main processing unit 124 includes an output and an input connected to an output port OV of 67 bits in length and an input port OV of 55 bits in length connected to an image memory unit not shown, an input of 55 bits in length connected to the output of junction unit 122, and an output of 55 bits in length connected to the input of branch unit 126. Main processing unit 124 has a program stored in advance. Main processing unit 124 carries out a process on the data included in the data packet applied from junction unit 122 according to an instruction code included in that data packet. The resultant data packet is provided to branch unit 126. When access to an image memory unit not shown is required, main processing unit 124 provides via output port OV a data packet of 67 bits long to the image memory unit, and receives a resultant data packet 55 bits long from the image memory unit via input port IV.

Figure 5:
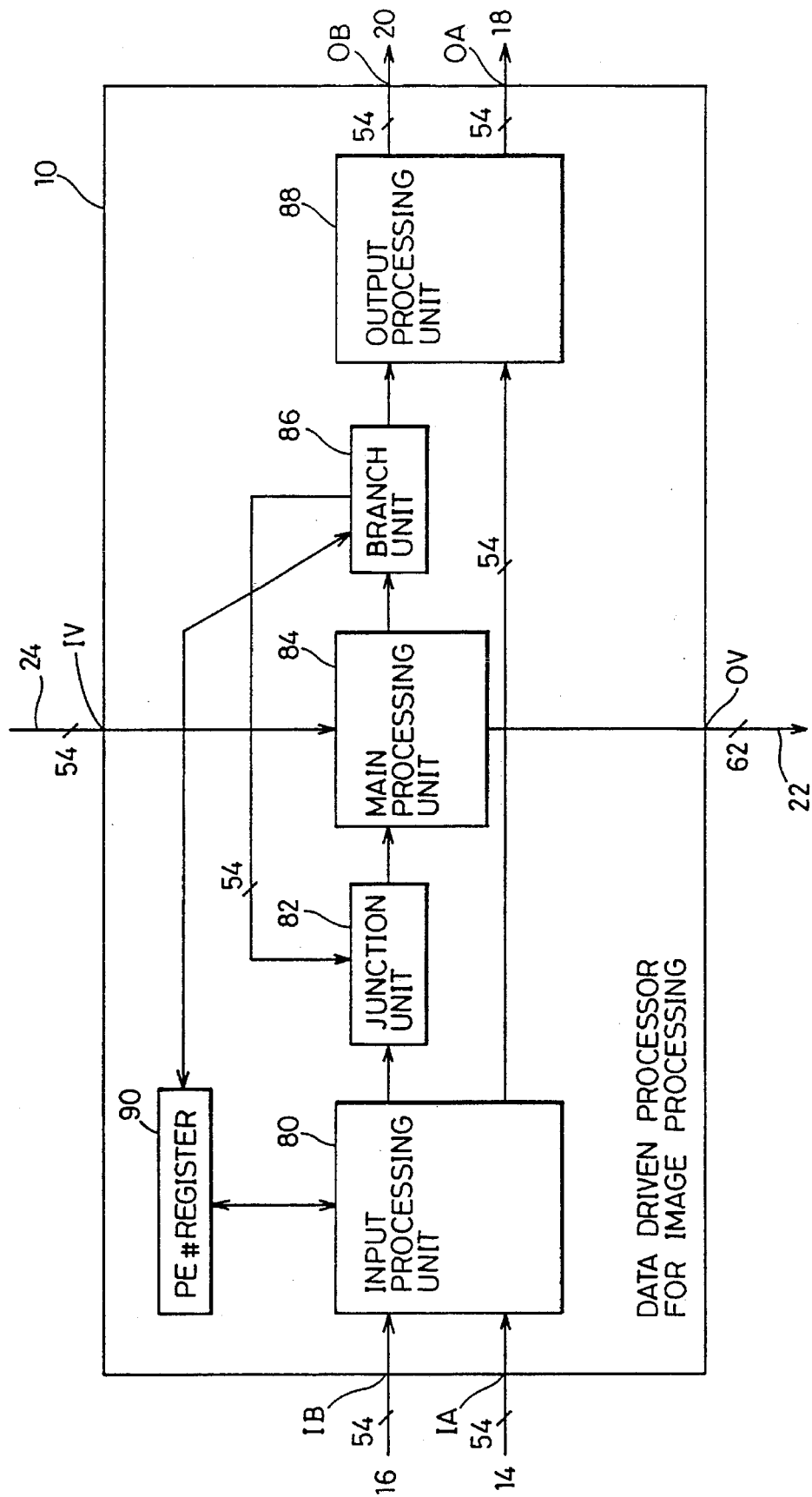
FIG. 5 is a block diagram showing a conventional data driven processor for image processing.
Figure 6:
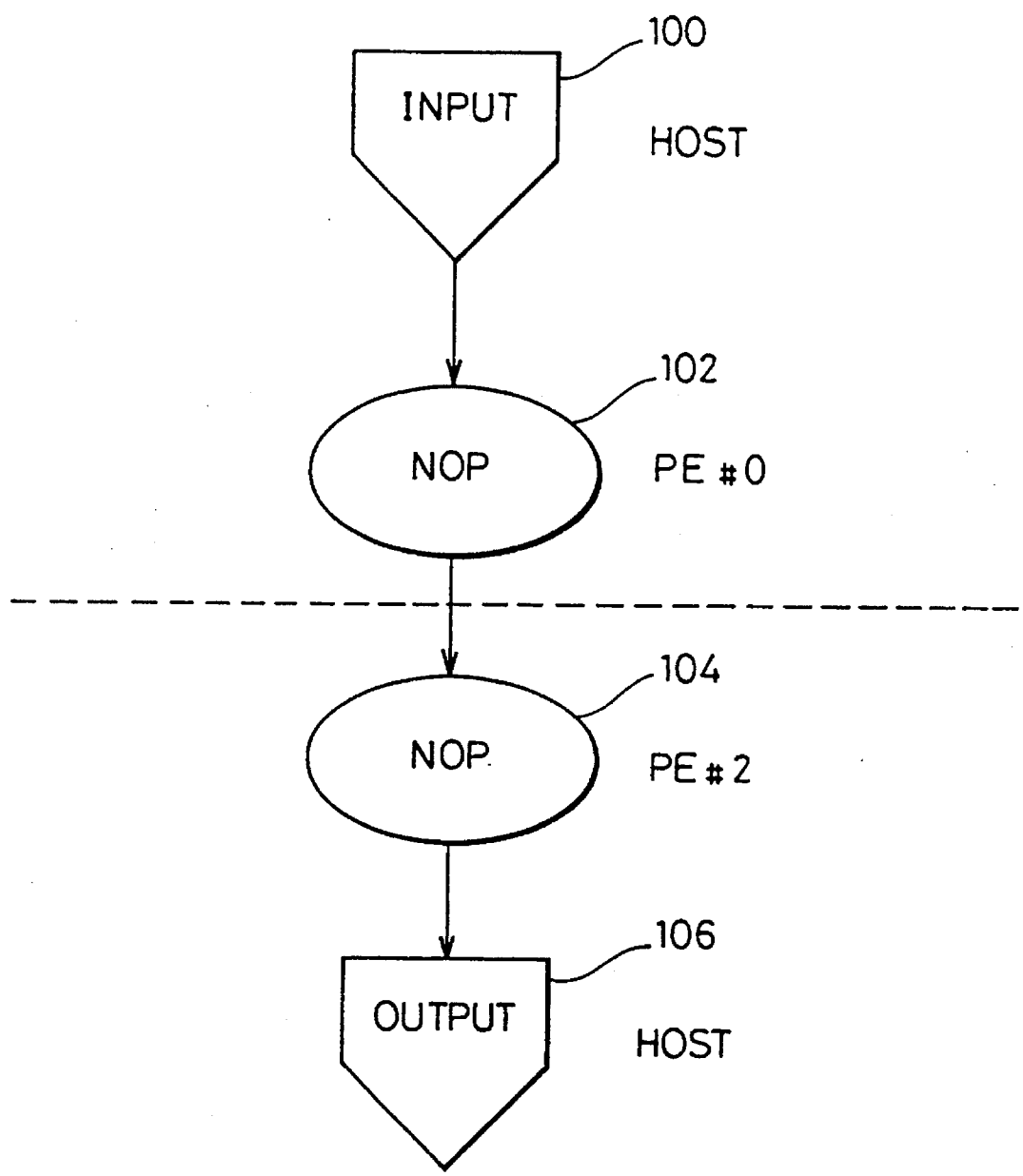
FIGS. 6 and 7 are simple examples of programs for conventional programs for path testing.
Figure 7:
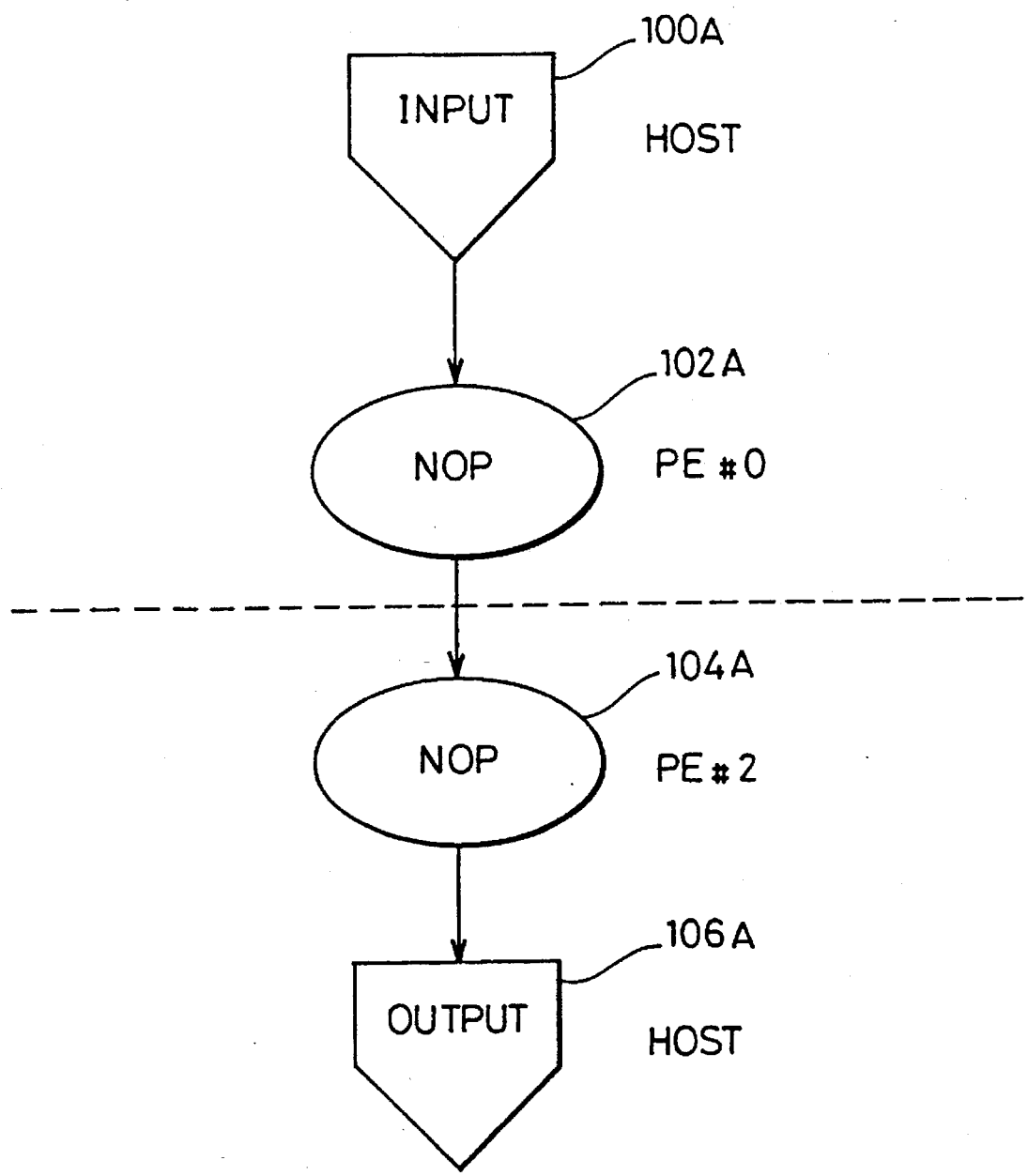

Branch unit 126 carries out an operation similar to that of branch unit 86 of the conventional data driven processor 10 shown in FIG. 5. Branch units 86 and 126 differ from each other in the packet length of the process data packet (i.e. 54 bits and 55 bits), respectively.

Output processing unit 128 selectively transmits data packets applied to two data packet inputs IA0 and IB0 to one of two data packet output ports OA and OB according to a method which will be described afterwards. Selection of an output port by output processing unit 128 differs in normal processing and in verification of a path connection.

H register 130 is referred to by output processing unit 128 in path connection verification, and stores one bit of information determining to which of output ports OA or OB the data packet is to be provided. Whether in a path connection verification mode or not is determined by the path connection flag included in the input data packet. The field configuration of the data packet will be described afterwards with reference to FIGS. 11 and 12.

An HBID terminal 132 of 2 bits is connected to output processing unit 128. A signal 134 for specifying the operation mode of output processing unit 128 is applied to HBID terminal 132. The details of the configuration and operation of output processing unit 128 will be described afterwards with reference to FIG. 10.

Figure 9:
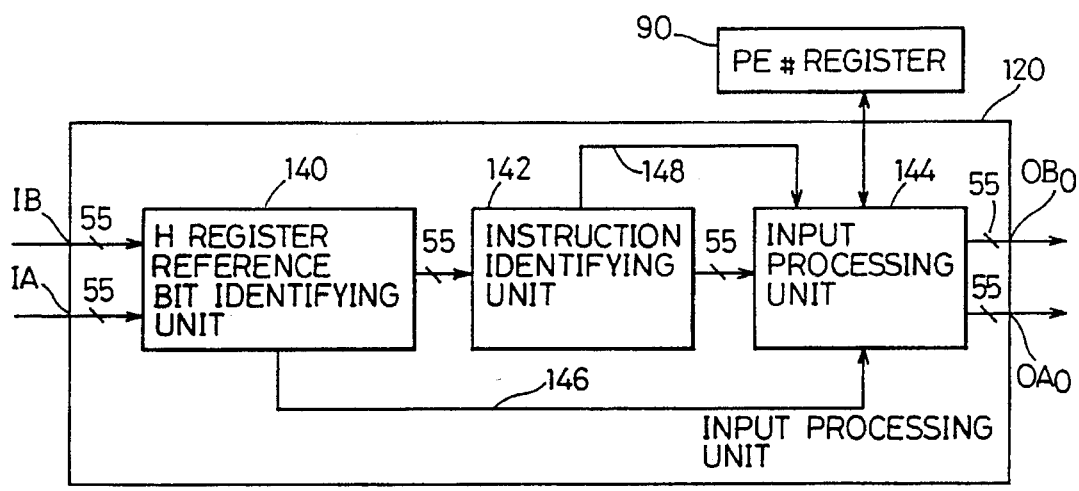
FIGS. 9 and 10 are block diagrams of an input processing unit and an output processing unit, respectively.

Referring to FIG. 9, input processing unit 120 includes an H register reference bit identifying unit 140, an instruction identifying unit 142, and an output port selecting unit 144.

H register reference bit identifying unit 140 identifies the value of the H register reference bit (details described afterwards) included in the data packet applied from input ports IA and IB. H register reference bit identifying unit 140 provides an H register reference bit result signal 146 to output port selecting unit 144, and the data packet to instruction identifying unit 142.

Instruction identifying unit 142 receives the data packet from H register reference bit identifying unit 140 to identify the instruction code included in that data packet, and applies an identification result signal 148 to output port selecting unit 144 with the data packet.

Output port selecting unit 144 operates in response to H register reference bit result signal 146 and identification result signal 148 to carry out an operation shown in the following Table 1.

TABLE 1

| H register reference bit result signal 146 | Identification result signal 148 | Operation |
| --- | --- | --- |
| 0 | 0 | Compare PE number of packet and value of PE number register. If match, packet is provided to port OB0, otherwise to port OA0. |
| 0 | 1 | Write data value of packet into PE number register, and discard packet. |
| 1 | 0 | Output packet to port OA0 |
| 1 | 1 | Not allowed |

TABLE 2

| Value of HBID terminal | Operation |
| --- | --- |
| 0 0 | Follow Table 3 |
| 0 1 | Reserved |
| 1 0 | Force output to port OA |
| 1 1 | Force output to port OB |

TABLE 3

| Input port identification signal 166 | Identification result signal 168 | Operation |
| --- | --- | --- |
| 0 | 0 | Output packet according to preset branching condition |
| 0 | 1 | Output packet according to contents of H register |
| 1 | 0 | Output packet according preset branching conditions |
| 1 | 1 | Write data contents of packet into H register, and then discard packet |

Referring to Table 1, if the values of H register reference bit result signal 146 and identification result signal 148 are both 0, output port selecting unit 144 compares the PE# (described afterwards) of the data packet applied from instruction identifying unit 142 with the value of PE# register 90. Output port selecting unit 144 provides the data packet to output OB0 when both values match, otherwise provides the data packet to output OA0.

When the value of H register reference bit result signal 146 is 0, and the value of identification result signal 148 is 1, output port selecting unit 144 writes the value of the first data field in the applied data packet into PE# register 90, and discard the packet.

When H register reference bit result signal 146 is 1, and identification result signal 148 is 0, output port selecting unit 144 provides the data packet via output OA0. This is the operation mode in testing a path connection as will be described afterwards.

Figure 10:
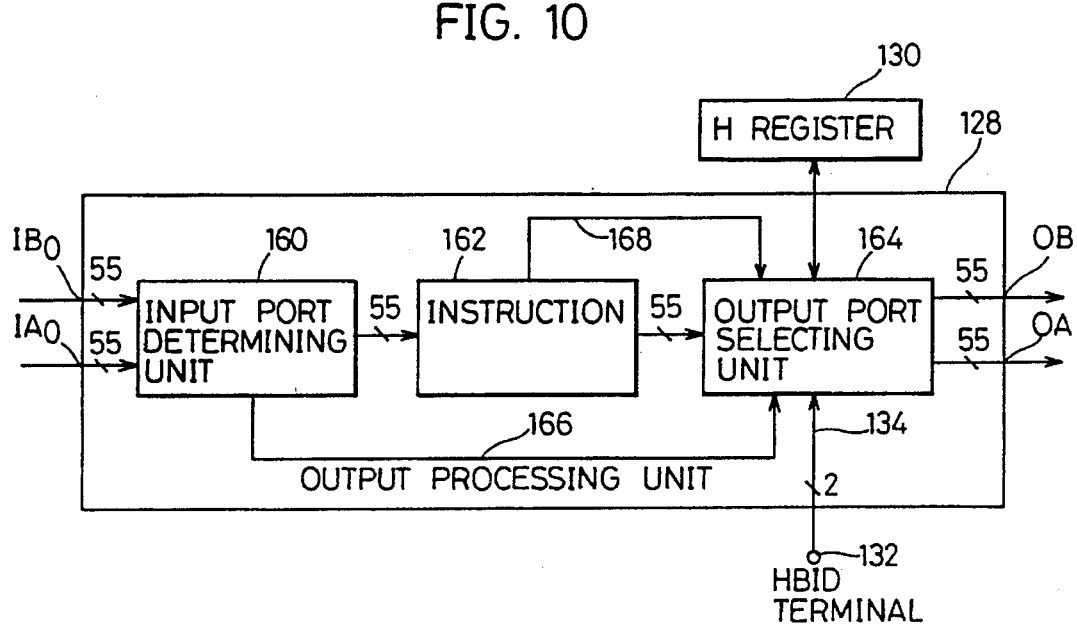

Referring to FIG. 10, output processing unit 128 includes an input port determining unit 160, an instruction identifying unit 162, and an output port selecting unit 164.

Input port determining unit 160 includes two data packet inputs IA0 and IB0, a data packet output connected to the input of instruction identifying unit 162, and an output terminal of an input port identifying signal 166 connected to output port selecting unit 164. Data packet input IA0 is connected to data packet output OA0 of input processing unit 120 shown in FIG. 8. Data packet input IB0 is connected to the data packet output of branch unit 126 of FIG. 8. Input port determining unit 160 generates and provides to output port selecting unit 164 an input port identifying signal 166 indicating which input ports of IA0 and IB0 the data packet is applied, and provides the data packet to instruction identifying unit 162.

Instruction identifying unit 162 includes a data packet input connected to the data packet output of input port determining unit 160, a data packet output connected to the data packet input of output port selecting unit 164, and a terminal for providing an identification result signal 168 applied to output port selecting unit 164. Instruction identifying unit 162 sets the value of identification result signal 168 to "1" when the instruction code (described afterwards) in the applied data packet is a data setting instruction to H register 130. If the value of the H register reference bit of the data packet is "1", instruction identifying unit 162 sets the value of identification result signal 168 to "1". Otherwise, instruction identifying unit 162 sets the value of identification result signal 168 to "0".

Output port selecting unit 164 includes a data packet input connected to the data packet output of instruction identifying unit 162, two data packet outputs connected to two output ports OA and OB, a terminal connected to HBID terminal 132, a terminal to which input port identification signal 166 is applied from input port identifying unit 160, and a terminal to which identification result signal 168 is applied from instruction identifying unit 162. Output port selecting unit 164 can also refer to or update the contents of H register 130.

Output port selecting unit 164 carries out an operation according to the above Tables 2 and 3.

Referring to Table 2, the operation of output processing unit 128 is mainly divided into two operation modes according to the value of signal 134 provided from HBID terminal 132. The first operation mode is when the value of signal 134 is "00", and the second operation mode is the case when the value of signal 134 is "10" or "11". An operation mode corresponding to "01" of signal 134 is not provided. The first operation mode specifies the output destination of a data packet by software. In this case, the selection of an output port is further divided into 4 as shown in Table 3. The second operation mode sets the output of the data packet to either output port OA or OB in a hardware manner by signal 134. In this case, selection of an output port is carried out according to the third and fourth rows of Table 2 irrespective of the contents of the data packet.

A mode of specifying an output port in a hardware manner is provided due to the following reason. Normally, the contents of H register 130 can be specified by applying a data packet meeting the condition of the fourth row in Table 3 to data driven processor 110. However, in some cases, such a specification of H register 130 itself cannot be carried out. In such a case, a signal of a value indicated in the third or fourth row of Table 2 is applied to output port selecting unit 164 via HBID terminal 132 shown in FIG. 10 allowing selection of an output port.

Referring to Table 3, the operation of output port selecting unit 164 in a software operation mode is further divided into three operations according to the combination of input port identification signal 166 and identification result signal 168. The first operation corresponds to identification result signal 168 being 0. In this case, an output port is selected from which the data packet is output according to preset branching conditions irrespective of the value of input port identification signal 166 (first and third rows in Table 3). The second corresponds to input port identification signal 166 being 0 and identification result signal 168 being 1. In this case, the contents of H register 130 is referred to, and an output port is selected (second row in Table 3). The third corresponding to input port identification signal 166 and identification result signal 168 both being 1. In this case, the contents of the first data field in the data packet is written into H register 130, and the packet is erased. Thus, the contents of H register 130 can be specified by applying a data packet including a specifying instruction of the contents of H register 130 to either of an appropriate data packet input IA0 or IB0 so as to satisfy such conditions.

Figure 11:
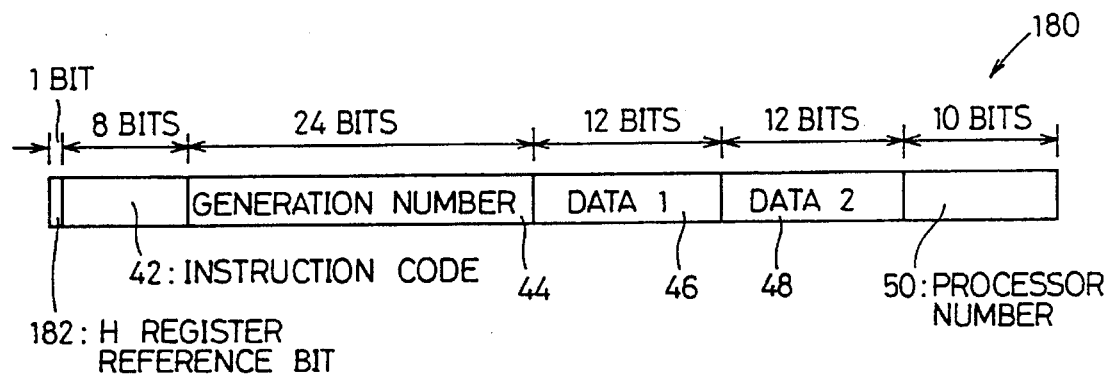
FIG. 11 shows a field configuration of an input data packet from the data driven processor to the memory interface device according to the first embodiment of the present invention.

FIG. 11 shows a field configuration of a data packet of 63 bits applied from main processing unit 164 shown in FIG. 8 to an image memory unit not shown. This data packet has a field configuration identical to that of the data packet applied to main processing unit 124 from junction unit 122.

Figure 1:
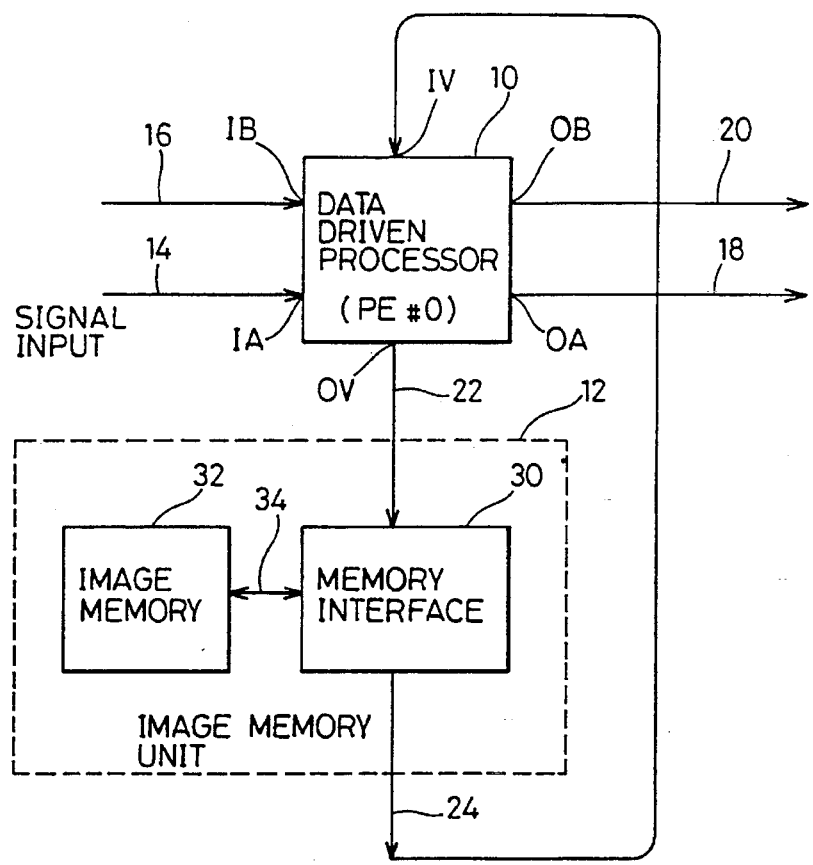
FIG. 1 is a diagram showing a system configuration of a conventional data driven information processing device for image processing.

Referring to FIG. 11, this data packet 180 includes an H register reference bit 182 of 1 bit, an instruction code 42 of 8 bits, a generation number 44 of 24 bits, first data 46 of 12 bits, second data 48 of the same 12 bits, and a processor number 50 of 10 bits. Instruction code 42, generation number 44, data 46 and 48, and processor number 50 have meanings identical to the corresponding fields of data packet 40 used in the conventional data driven processor shown in FIG. 1. H register reference bit 182 is set to "1" and "0" in a path connection verification mode and in a normal operation mode, respectively. H register reference bit 182 with a value of "1" indicates that the operation is in a path connection verification mode.

Figure 12:
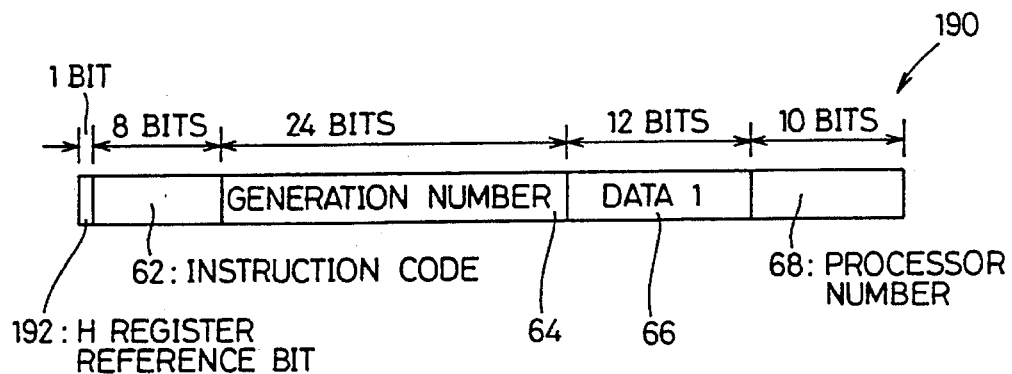
FIG. 12 shows a field configuration of an input/output data packet of the data driven processor and an input data packet from the memory interface device to the data driven processor according to the first embodiment of the present invention.

FIG. 12 shows a field configuration of a data packet applied from an image memory unit not shown to main processing unit 124. This field configuration is identical to that of the data packet transferred between that data driven processor 110 and another data driven processor via data transmission paths 112, 114, 116 and 118.

Figure 3:
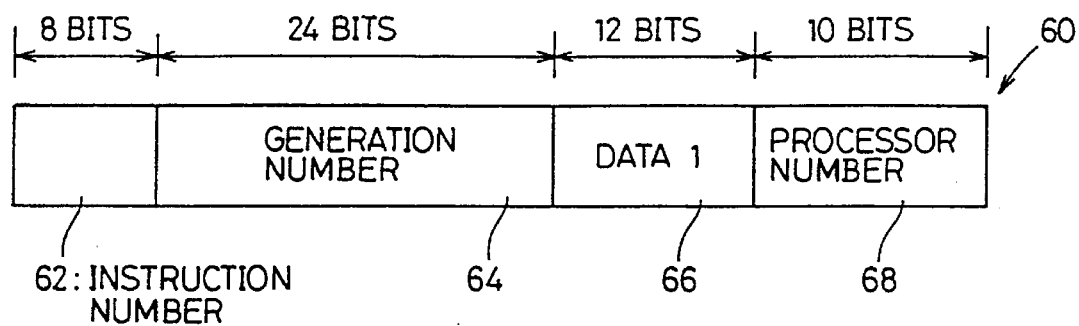
FIG. 3 shows a field configuration of an input/output data packet of a processor, and an input data packet from a memory interface device to a processor.

Referring to FIG. 12, a data packet 190 includes an H register reference bit 192 of 1 bit, an instruction code 62 of 8 bits, a generation number 64 of 24 bits, first data 66 of 12 bits, and a processor number 68 of 10 bits. Instruction code 62, generation number 64, first data 66, and processor number 68 have meanings identical to those of the corresponding fields in data packet 60 used in the conventional data driven processor shown in FIG. 3. H register reference bit 192 is set to "1" in a path connection verification mode, otherwise to "0".

The operation of the data driven processor according to the present first embodiment will be described hereinafter with reference to FIGS. 8–12, in the order of: (1) PE# register specification; (2) normal processing; (3) H register specification; and (4) path connection verification processing.

(1) PE# register specification

APE# register is specified as set forth in the following. Referring to FIG. 12, a data packet for specification has a PE# register specifying instruction stored in instruction code 62. A PE# to be specified in PE# register 90 of a destinated data driven processor, and the aforementioned mask value and match value are stored in first data 66. The PE# in processors PE#0–PE#3 takes a default value of 0 after the master resetting. Each processor treats the first data packet input after the master resetting as a data packet addressed to itself, and stores the PE#, the mask value and the match value in that data packet into a corresponding PE# register, mask data register, and match data register, respectively. It is to be noted that the instruction of a first data packet input after the master reset is the aforementioned PE# register specification instruction.

By this initialization specifying method, the PE#, the mask value, and the match value of each connected processor are sequentially specified starting from the processor connected closest to the host (i.e. from processor PE#0 or PE#1 in this embodiment).

(2) Normal processing

In a normal processing mode, signal 134 from HBID terminal 132 shown in FIGS. 8 and 10 is set to "00".

Referring to FIG. 12, "0" is stored in H register reference bit 192 of data packet 190. An instruction code according to a process to be carried out is stored in instruction code 62. A generation number is stored in generation number 64 in an order according to the time series input to data driven processor 110. Data to be calculated is stored in first data 66. A processor number of a processor to be addressed is stored in processor number 68.

Referring to FIG. 9, when a data packet is input via input port IA or IB, H register reference bit identifying unit 140 looks into the contents of H register reference bit 192 shown in FIG. 12. In normal processing, H register reference bit 192 has a value of "0" as described before. Therefore, H register reference bit result signal 146 is "0". Instruction identifying unit 142 sets the value of identification result signal 148 to "0".

Output port selecting unit 144 compares the value of processor number 68 (refer to FIG. 12) of the applied data packet with the value of PE# register 90, and provides the data packet to output OB0 if the values match, and otherwise to data packet output OA0. This is a process according to the first row in Table 1.

When the value of processor number 68 of the data packet and PE# register 90 match, the data packet is applied to junction unit 122. Junction unit 122 carries out a merging process of data packets from input processing unit 120 and data packets from branch unit 126, and detects the paired data. Then, a data packet that can be subjected to operation is applied to main processing unit 124.

Main processing unit 124 applies a process determined by the instruction code on the data of the applied data packet. The resultant data packet is applied to branch unit 126. When access to an image memory unit (not shown) is required, main body processing unit 124 provides the data packet to the image memory unit via output port OV, and receives a data packet of the accessed result of the image memory unit via input port IV.

Branch unit 126 compares the value of processor number 68 (refer to FIG. 12) of the applied data packet with the contents of PE# register 90. Branch unit 126 provides the data packet to junction unit 122, when both values match, otherwise to output processing unit 128.

Referring to FIG. 10, input port determining unit 160 of output processing unit 128 determines from which port of inputs IA0 and IB0 the data packet was applied, and sets input port identification signal 166 to "0" and "1" when the data packet was from input IA0 and input IB0, respectively. The present case is normal processing. The H register reference bit value of the data packet is then "0". Therefore, the data packet applied to input port determining unit 160 via input port IA0 has been identified as not addressed to itself in input processing unit 120 of FIG. 8. A data packet applied to input port identifying unit 160 via input IB0 has been identified as addressed to itself in input processing unit 120 shown in FIG. 8.

Instruction identifying unit 162 sets identification result signal 168 to "0" since instruction code 62 (refer to FIG. 12) of the data packet is not an H register specifying instruction, and H register reference bit 192 is "0".

Output port selecting unit 164 operates as shown in the first or third row of Table 3 in this normal processing mode.

In other words, output port selecting unit 164 provides a data packet according to preset branching conditions, similar to the conventional case, using prestored mask and match values, as in output processing unit 88 shown in FIG. 5. More specifically, output port selecting unit 164 takes the logical product of processor number 68 (FIG. 12) of an input data packet and the prestored mask value. Output port selecting unit 164 compares the logical product result with the prestored match value. Output port selecting unit 164 provides the packet to output port OA when the values match, otherwise to output port OB.

(3) H register specification

An H register 130 (FIGS. 8 and 10) is specified as set forth in the following. Referring to FIG. 12, H register reference bit 192 is set to "0". Instruction code 62 is set to an H register specifying instruction. A value to be specified to H register 130 ("0" or "1") is set in first data 66. The processor number 68 is set to the number of the processor of interest.

Referring to FIG. 9, H register reference result signal 146 is "0" regardless of which input port IA or IB the data packet is applied from. Identification result signal 148 is also "0". According to the first row of Table 1, the packet is applied to junction unit 122 via output OB0 when processor number 68 of the data packet matches the contents of PE# register 90. Otherwise, the data packet is applied directly to output processing unit 128.

This data packet is applied to output processing unit 128 via junction unit 122, main processing unit 124, and branch unit 126.

Referring to FIG. 10, this data packet is applied to input port determining unit 160 via input IB0. Therefore, input port identification signal 166 is set to "1". Because the instruction code is an H register specifying instruction, identification result signal 168 is also set to "1". According to the fourth row in Table 3, output port selecting unit 164 writes the data value of the data packet into H register 130, and erases the packet. By this operation, the value of either "0" or "1" is written into H register 130.

In a path connection verification mode, i.e. when the H register reference bit value of the data packet is "1", selection of an output port is carried out as follows. When the stored contents of H register 130 is "0", the data packet is provided to output port OA. If the stored content is "1", the data packet is provided to output port OB.

(4) Path connection verification

Figure 13:
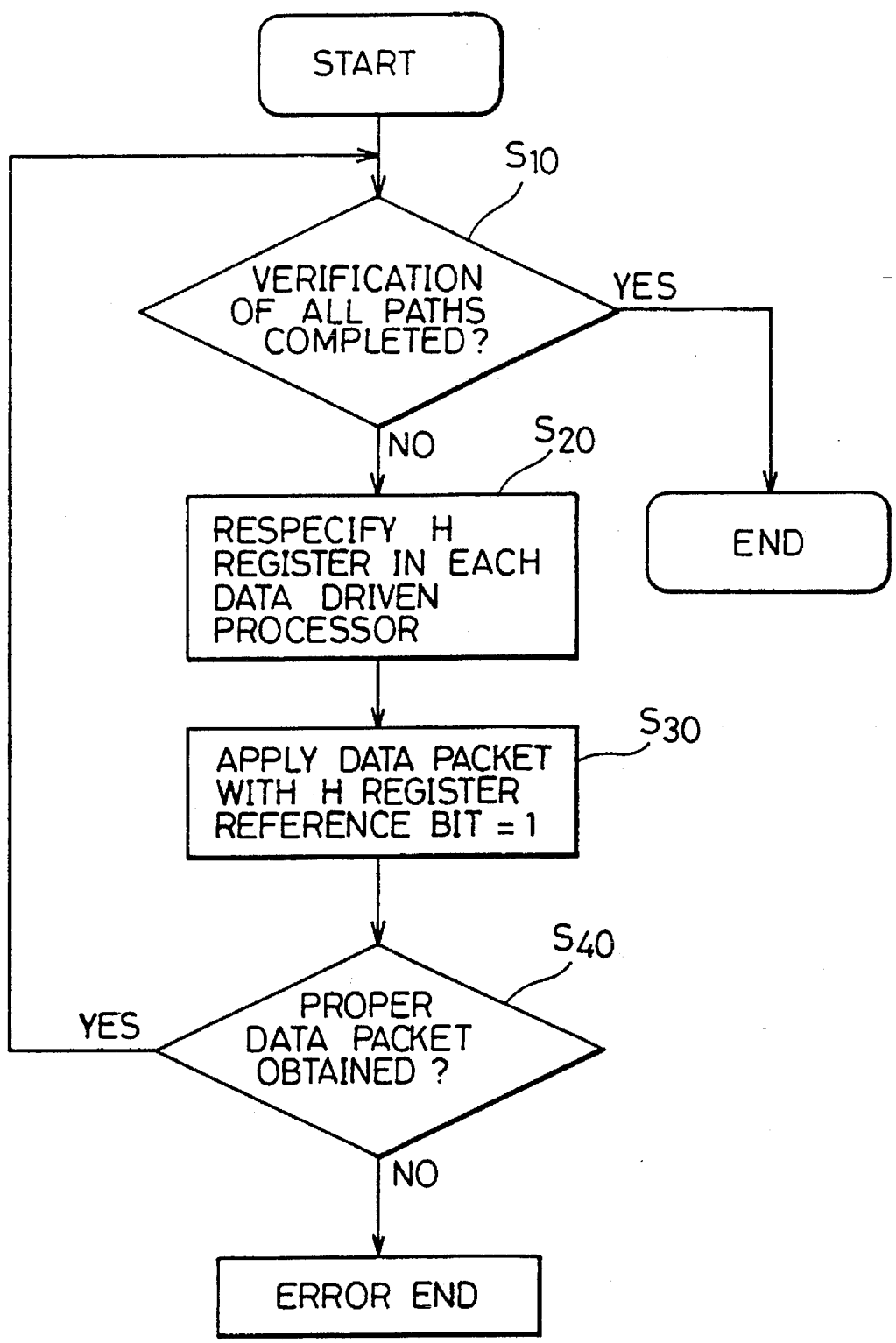
FIG. 13 is a flow diagram showing the procedure of a method of verifying a path connection according to the first embodiment of the present invention.

This is carried out as set forth in the following. Referring to FIG. 13, determination is made whether all the paths are verified or not. If all the paths are verified, the path connection verification process ends. If a path exists that is not yet verified, the process of step S20 is carried out.

At step S20, the H register of each data driven processor is set so that the next path to be verified is obtained.

At step S30, a data packet having the H register reference bit set to "1" is applied to the first data driven processor in the connection path. In the case of the path connection shown in FIG. 4, for example, this first processor is processor PE#0 (at input port IA) or processor PE#1 (at input port IB).

At step S40, determination is made whether a proper data packet is obtained at the output port of the last data driven processor in the connection path. In the path shown in FIG. 4, determination is carried out on the data packet obtained from output port OA of processor PE#2 or output port OB of processor PE#3. To which processor the data packet is applied, and from which processor the data packet is obtained are determined according to the path to be tested.

Figure 4:
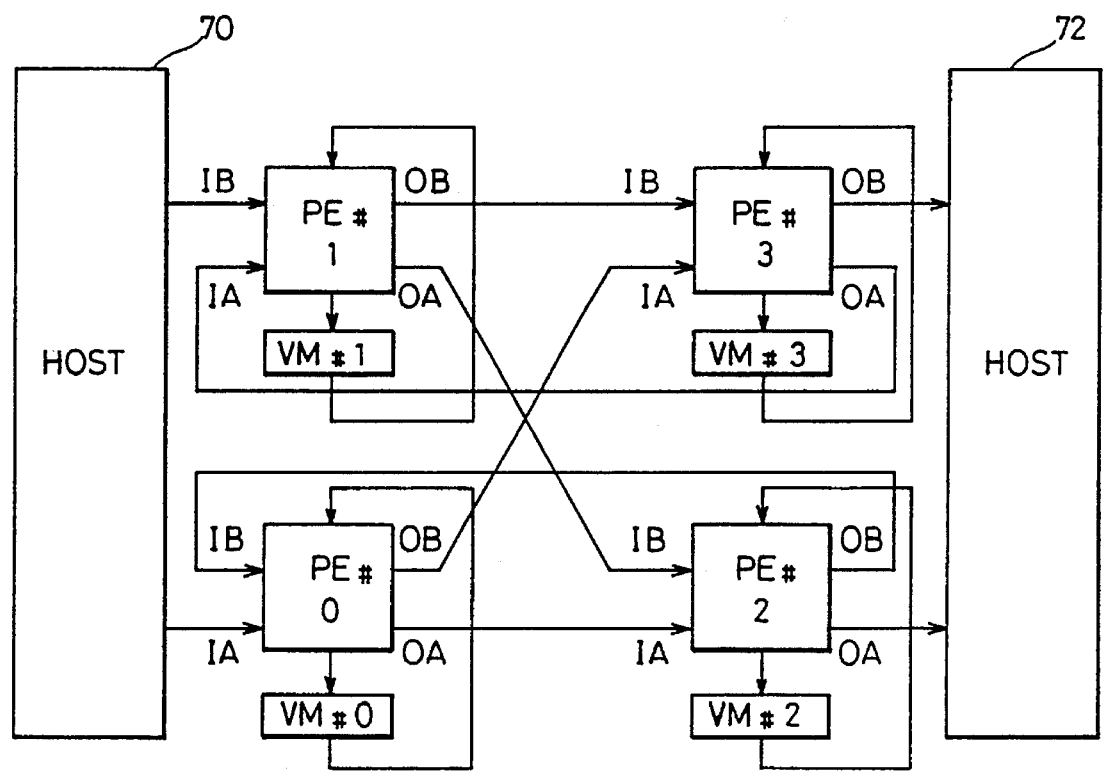
FIG. 4 shows an example of connection of processors when a system is formed using four data driven processors for image processing.

In the path connection shown in FIG. 4, verification is considered of the four paths shown in FIGS. 14(a)–14(d).

Verification of each connection path of the network shown in FIG. 4 is carried out by verifying the four paths (a)–(d) shown in FIGS. 14(a)–14(d).

It is appreciated from FIGS. 14(a)–14(d) that to which processor a data packet is applied, and from which processor a data packet is obtained are determined according to the connection path to be tested.

Figure 14A:
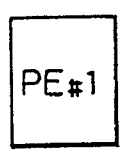
FIGS. 14(a)–14(d) are diagrams schematically showing an example of connection paths between data processors.
Figure 14A:
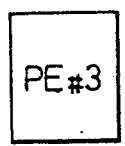
Figure 14A:
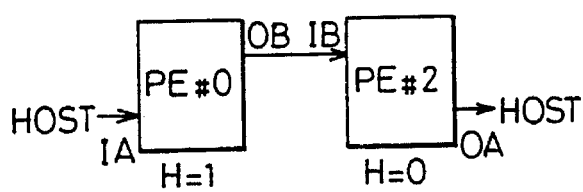

In verifying the connection path shown in FIG. 14(a), "1" and "0" are stored in the H registers of processors PE#0 and PE#2, respectively.

Figure 14B:
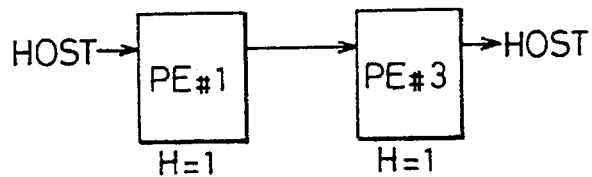
Figure 14B:
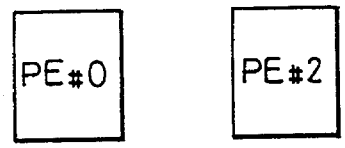

In verifying the path connection of FIG. 14(b), "1" and "1" are stored in the H registers of processors PE#1 and PE#3, respectively.

Figure 14C:
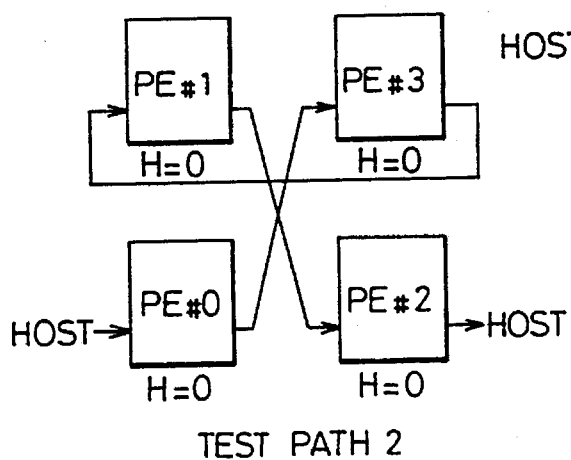

In verifying the path connection of FIG. 14(c), "0" is stored in all the H registers of processors PE#0, PE#1, PE#2, and PE#3.

Figure 14D:
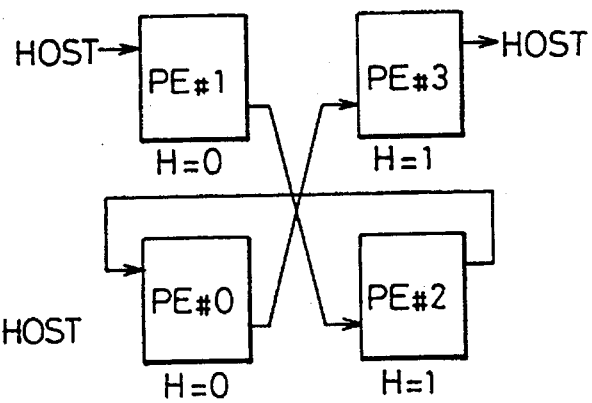

In verifying the path connection of FIG. 14(d), "0", "0", "1" and "1" are stored in the H registers of processors PE#0, PE#1, PE#2 and PE#3, respectively.

A data packet for connection verification applied to a processor after connection of the path is completed is set forth in the following. Referring to FIG. 12, H register reference bit 192 is set to "1". Instruction code 62, generation number 64, data 66, and processor number 68 are set to respective arbitrary bit patterns.

In testing the path connection of FIG. 14(a), for example, the data packet is applied to input port IA of processor PE#0.

Referring to FIG. 9, H register reference bit identifying unit 140 sets H register reference bit result signal 146 to "1".

Output port selecting unit 144 provides the packet to output OA0 according to the third row in Table 1 unconditionally. Therefore, the data packet is directly applied to the first data packet input IA0 of output processing unit 128, as shown in FIG. 8.

Referring to FIG. 10, input port determination signal 166 becomes "0" because the data packet is applied to input port determining unit 160 via input IA0. Because the H register reference bit of the data packet is "1", identification result signal 168 provided from instruction identifying unit 162 becomes "1".

According to the second row in Table 3, output port selecting unit 164 refers to the contents of H register 130. Output port selecting unit 164 selects output port OA when "0" is stored in H register 130.

When a data packet having the H register reference bit set to "1" is applied, the data driven processor selects an output port according to the stored contents of H register 130. Therefore, it is possible to select a path of a data packet irrespective of the bit patterns of the other portions of the data packet and then transmit the packet through the path. Here, the contents of the data packet will not be referred to or updated except for the H register reference bit. The contents of the output data packet will not differ depending upon the contents of an accumulator. Thus, verification of a path connection between processors which was conventionally difficult or impossible can be carried out easily in such a data driven information processing device using this data driven processor.

[Embodiment 2]

According to a second embodiment of the present invention, an input preprocessing unit 200 and an output postprocessing unit 202 are provided before and after a processor 10 (refer to FIG. 5) identical to a conventional data driven processor, and an H register 204 is provided as in the first embodiment, whereby effects similar to those of the first embodiment can be obtained.

Figure 15:
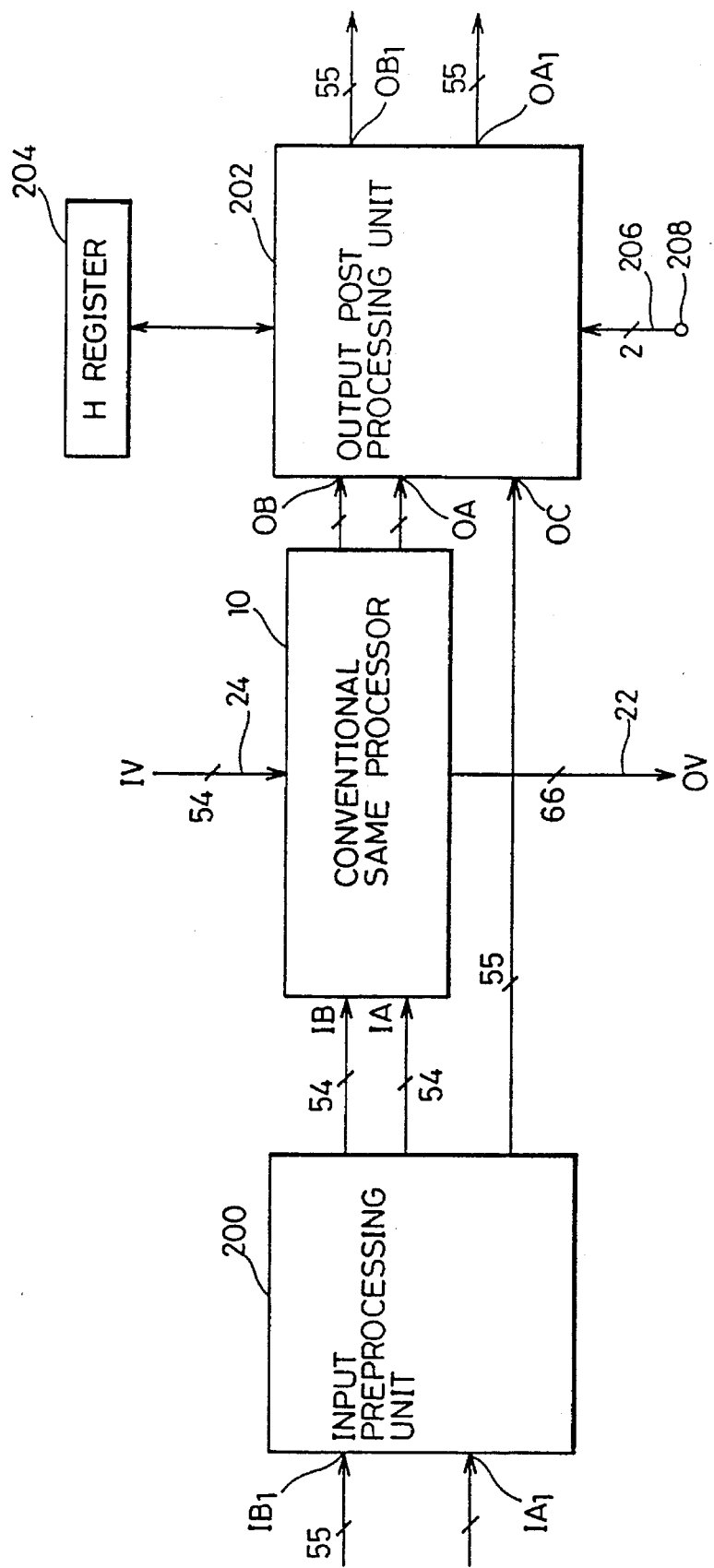
FIG. 15 is a block diagram of a data driven processor for image processing according to a second embodiment of the present invention.

Referring to FIG. 15, a data packet applied to input preprocessing unit 200 via input ports IA1 and IB1 is 55 bits long. A data packet provided from the two output ports OA1 and OB1 of output postprocessing unit 202 is also 55 bits long. The packet length and field configuration of these data packets and the data packet which will be described afterwards are only by way of examples, and an arbitrary packet length or field configuration may be employed.

As shown in FIG. 15, input preprocessing unit 200 includes three outputs. Two of the three outputs are connected to input ports IA and IB of processor 10. The width of these transmission paths is 54 bits, respectively.

Output postprocessing unit 202 includes three inputs. Two of the three inputs are connected to output ports OA and OB of processor 10. The remaining one input of output postprocessing unit 202 is connected to the remaining one output of input preprocessing unit 200.

Similar to the case of FIG. 5, data packets of 54 bits and 66 bits are input/output between processor 10 and an image memory unit not shown via input port IV and output port OV.

Figure 2:
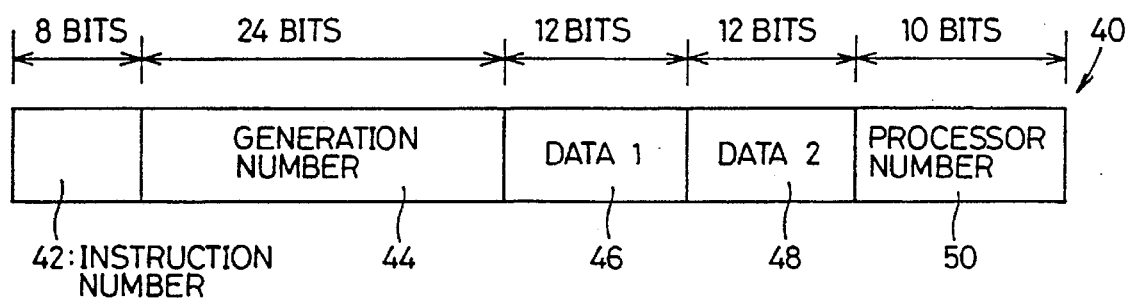
FIG. 2 is a diagram showing a field configuration of an input data packet from a data driven processor to a memory interface device in a conventional data driven information processing device.

Output postprocessing unit 202 refers to the contents of H register 204, and can update the value thereof. Output postprocessing unit 202 is connected to HBID terminal 208. Identical to HBID terminal 132 shown in FIGS. 8 and 10, HBID terminal 208 serves to provide a signal 206 of two bits to output postprocessing unit 202. The meaning of signal 206 is identical to that shown in Table 2. The data packets used in the second embodiment of 55 bits in length, 66 bits in length, and 54 bits in length, have a field configuration identical to that shown in FIG. 12, the data packet 40 shown in FIG. 2, and the data packet 60 shown in FIG. 3, respectively.

Figure 16:
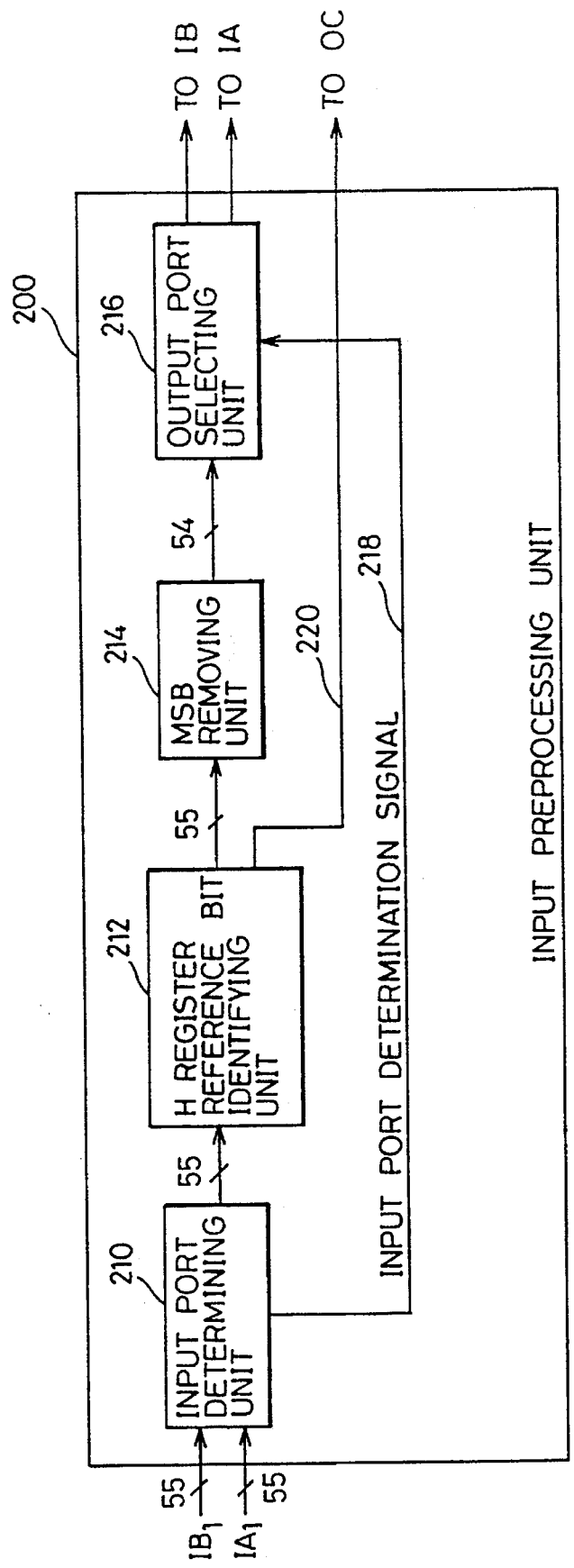
FIGS. 16 and 17 are block diagrams of an input preprocessing unit and output post processing unit, respectively, according to the second embodiment.

Referring to FIG. 16, input preprocessing unit 200 includes an input port determining unit 210, an H register reference bit identifying unit 212, a most significant bit (MSB) removing unit 214, and an output port selecting unit 216.

Input port determining unit 210 includes two inputs connected to input ports IA1 and IB1, respectively, an output connected to the input of H register reference bit identifying unit 212, and an output terminal of input port determination signal 218. Input port determination signal 218 is applied to output port selecting unit 216. Input port determining unit 210 determines which of input ports IA1 or IB1 a data packet is applied, and changes the value of input port determination signal 218 according to the result. Input port determining unit 210 also provides a data packet directly to H register reference bit identifying unit 212.

H register reference bit identifying unit 212 includes an input of 55 bits long connected to the output of input port identifying unit 210, an output of 55 bits long connected to the input of MSB removing unit 214, and an output connected to a test data packet transmission path 222 of 55 bits long. H register reference bit identifying unit 212 selectively provides a data packet to test data packet transmission path 220 or MSB removing unit 214 according to whether the value of the H register reference bit of the applied data packet is "1" or "0".

MSB removing unit 214 includes an input of 55 bits in length connected to the output of H register reference bit identifying unit 212, and an output of 54 bits in length connected to output port selecting unit 216. MSB removing unit 214 generates and provides to output port selecting unit 216 a data packet having the most significant bit of the applied data packet, i.e. the H register reference bit, removed.

Output port selecting units 216 includes an input of 54 bits in length connected to the output of MSB removing unit 210, two data outputs each of 54 bits in length connected to two input ports IA and IB, respectively of processor 10 shown in FIG. 15, and an input terminal of input port determination signal 218. Output port selecting unit 216 selects an output port according to input port determination signal 218 so that the data packet input via input port IA1 is provided to input port IA of processor 10 and the data packet applied via input port IB1 is provided to input port IB.

Referring to FIG. 15, processor 10 is identical to that shown in FIG. 5. The length of the data packet to be processed is also identical. Processor 10 provides an output data packet to the two input ports of output postprocessing unit 202 via output port OA or OB. This selection of an input port is carried out in a manner similar to that of a conventional one.

Figure 17:
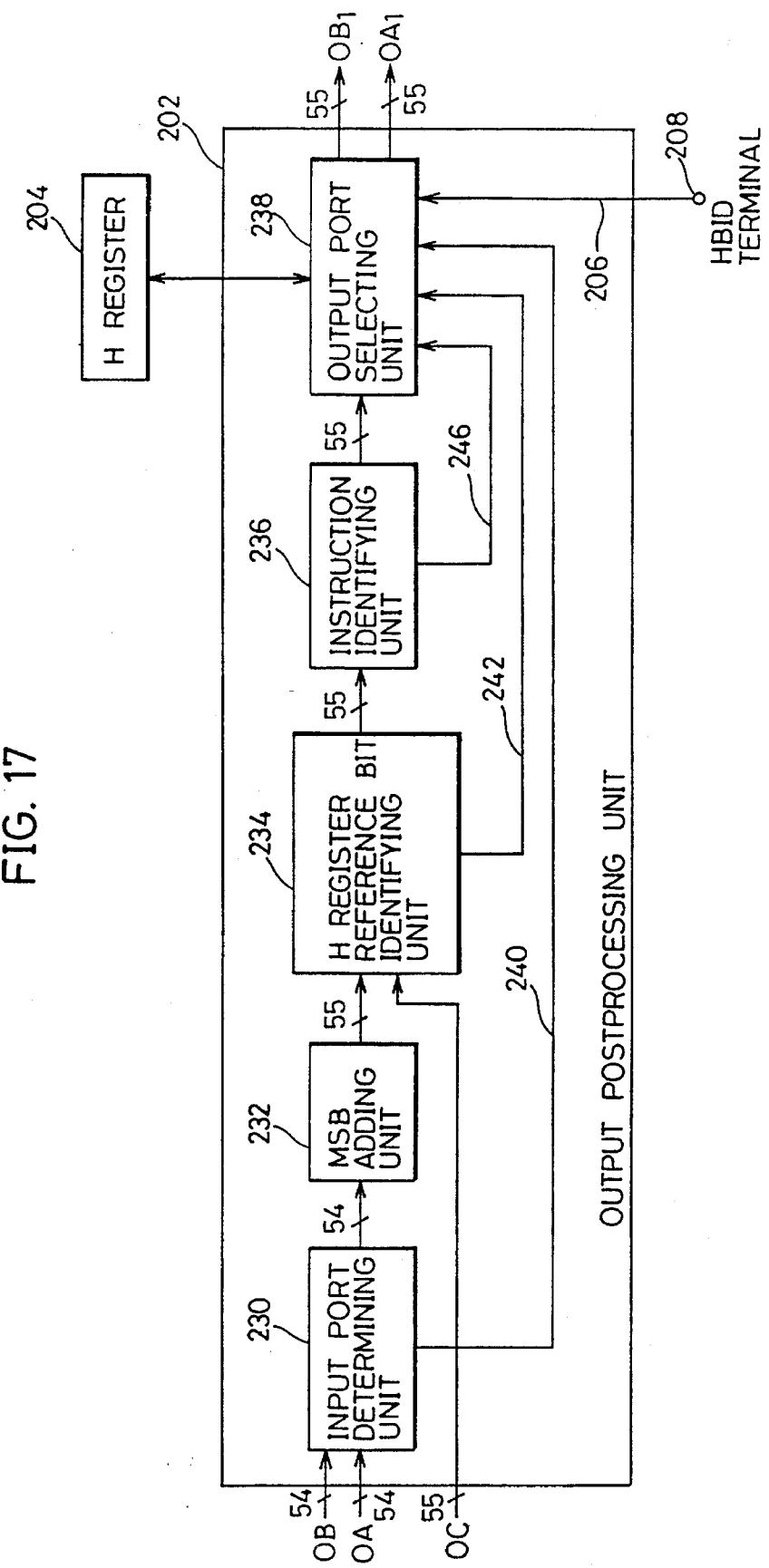

Referring to FIG. 17, output postprocessing unit 202 includes an input port determining unit 230, a most significant bit (MSB) adding unit 232, an H register reference bit identifying unit 234, an instruction identifying unit 236, and an output port selecting unit 238.

Input port determining unit 230 includes two input ports of 54 bits in length connected to two output ports OA and OB, respectively, of processor 10 shown in FIG. 15, an output of 54 bits in length connected to the input of MSB adding unit 232, and an output terminal of input port determination signal 240 connected to output port selecting unit 238. Input port determining unit 230 provides to output port selecting unit 238 an input port determining signal 240 indicating from which of output ports OA and OB a data packet was provided.

MSB adding unit 232 includes an input of 54 bits in length connected to the output of input port determining unit 230, and an output of 55 bits in length connected to one of the two inputs of H register reference bit identifying unit 234. MSB adding unit 232 adds "0" as the most significant bit to the head of the data packet applied from input port determining unit 230. The data packet with the added most significant bit is applied to H register reference bit identifying unit 234.

H register reference bit identifying unit 234 includes an input of 55 bits in length connected to the output of MSB adding unit 232, an input of 55 bits in length connected to the output of 55 bits in length of H register reference bits identifying unit 212 shown in FIG. 16, an output of 55 bits in length connected to the input of instruction identifying unit 236, and an output terminal of H register reference bit result signal 242 to output port selecting unit 238. H register reference bit identifying units 234 provides an H register reference bit result signal 242 of "1" or "0" to output port selecting unit 238 according to the value of the H register reference bit of the input data packet. H register reference bit identifying unit 234 provides to instruction identifying unit 236 a data packet applied from MSB adding unit 232 or H register reference bit identifying unit 212 shown in FIG. 16.

Instruction identifying unit 236 includes an input of 55 bits in length connected to the output of H register reference bit identifying unit 234, an output of 55 bits in length connected to output port selecting unit 238, and an output terminal of identification result signal 246 provided to output port selecting unit 238. Instruction identifying unit 236 provides the applied data packet to output port selecting unit 238, and also identifies whether the instruction code in the data packet is a specifying instruction of H register 204. The identification result is provided to output port selecting unit 238 as identification result signal 246. In this case, identification result signal 246 is set to "1" when the instruction code is an H register specifying instruction, otherwise set to "0".

Output port selecting unit 238 includes an input of 55 bit in length connected to instruction identifying unit 236, a terminal for receiving a signal 206 from HBID terminal 208, three terminals for receiving an input port determination signal 240, an H register reference bit result signal 242, and identification result signal 246, and two outputs connected to output ports OA1 and OB1. Output port selecting unit 238 can refer to the contents of H register 204 and update the value thereof. Output port selecting unit 238 refers to the contents of input port determination signal 240, H register reference bit result signal 242, identification result signal 246, signal 206 from HBID terminal 208, and H register 204, to select one of the two output ports and output a data packet, if necessary.

The relationship between the values of each of the signals and an output port selected by output port selecting unit 238 is shown in the following Tables 4 and 5.

TABLE 4

| Value of HBID terminal | Operation |
| --- | --- |
| 0 0 | Follow Table 5 |
| 0 1 | Reserved |
| 1 0 | Force output of packet to port OB0 |
| 1 1 | Force output of packet to port OA0 |

TABLE 5

| Input port determination signal 240 | H register reference bit result signal 242 | Identification result signal 246 | Operation |
| --- | --- | --- | --- |
| 0 | 0 | 0 | Force output of packet to port OA0 |
| 1 | 0 | 0 | Force output of packet to port OB0 |
| X | 0 | 1 | Write data contents of packet to H register, and then erase packet |
| X | 1 | 0 | Output according to contents of H register |
| X | 1 | 1 | Not allowed |

An operation of the data driven processor of the second embodiment shown in FIGS. 15 and 17 will be described hereinafter in the order of: (1) PE register specification; (2) normal processing; (3) H register specification; and (4) path connection verification. It is assumed that signal 206 provided from HBID terminal 208 shown in FIG. 17 is "00" out of the four values shown in Table 4.

(1) PE register specification

In specifying a PE# register, the H register reference bit of a data packet is set to "0".

A data packet is applied to input port determining unit 210 of input preprocessing unit 200 via input port IA1 or IB1. Input port determination signal 218 becomes "0" or "1" according to which of the input ports the data packet is input. The data packet is applied to H register reference bit identifying unit 212.

H register bit identifying unit 212 provides the data packet to MSB removing unit 214 because the H register reference bit of the applied data packet is "0". MSB removing unit 214 generates a data packet of 54 bits having the most significant one bit removed, and provides the generated data packet to output port selecting unit 216. Output port selecting unit 216 provides the data packet to input port IA or IB of processor 10 shown in FIG. 15 according to the value of input port determination signal 218.

In processor 10, the value of a PE# register is set according to a process similar to that of a conventional one. Then, this data packet is discarded.

(2) Normal processing

Referring to FIG. 12, H register reference bit 192 of data packet 190 is set to "0". An instruction code according to a process is set in instruction code 62. A generation number according to the applied order to processor 10 is allocated to generation number 64. Data used for operation is stored in first data 66. The number of a processor of interest is stored in processor number 68.

It is assumed that this data packet is applied via input port IA1 to input preprocessing unit 200 shown in FIG. 16. Input port identifying unit 210 sets the value of input port determination signal 218 to "0", and provides the signal to input port selecting unit 216. H register reference bit identifying unit 212 provides the data packet to MSB removing unit 214 because the H register reference bit is "0". MSB removing unit 214 generates a data packet of 54 bits having the most significant 1 bit of the applied data packet removed. The generated data packet is applied to output port selecting unit 216. Output port selecting unit 216 provides the data packet to input port IA of processor 10 shown in FIG. 15 because the value of input port determination signal 218 is "0".

Processor 10 carries out an operation identical to that of processor 10 shown in FIG. 5 on this data packet, which is provided to output port OA or OB.

Referring to FIG. 17, input port determining unit 230 determines from which of output ports OA and OB the data packet is applied, and sets input port determination signal 240 to "0" or "1". MSB adding unit 232 sets the most significant bit of the data packet to "0". H register reference bit identifying unit 234 sets the H register reference bit result signal to "0", and provides the signal to output port selecting unit 238. Instruction identifying unit 236 provides an identification result signal 246 of "0" to output port selecting unit 238. According to the first or second row of Table 5, output port selecting unit 238 provides the data packet from output OA1 and OB1 when the data packet is applied from output port OA and output port OB, respectively.

In the data driven processor of the second embodiment shown in FIG. 15, normal processing is carried out as in a conventional one.

(3) H register specification processing

Referring to FIG. 5, H register reference bit 192 is set to "0". A bit pattern corresponding to the specification instruction of the contents of the H register is specified in instruction code 62. The value to be specified in H register 204, i.e. "0" or "1", is specified in first data 66. The number of a processor of interest is set in processor number 68.

Referring to FIG. 16, a data packet applied to the input preprocessing unit is provided to processor 10 from one of the outputs of 54 bits of output port selecting unit 216, similar to a data packet of normal processing. Processor 10 directly provides this data packet to output postprocessing unit 202.

Referring to FIG. 17, the data packet has "0" added to the most significant bit by MSB adding unit 232, and is provided to H register reference bit identification unit 234. H register reference bit result signal 242 becomes "0". Instruction identifying unit 236 sets the value of identification result signal 246 to "1". According to the third row of Table 5, output port selecting unit 238 writes the data contents of the applied data packet into H register 204, and discards the data packet. Here, the value of input port determination signal 240 is neglected.

(4) Path connection verification

Verification of a path connection is carried out as set forth in the following. Referring to FIG. 5, "1" is set in H register reference bit 192. An arbitrary bit pattern is specified in instruction code 62, generation number 64, data 66, and processor number 68 respectively. This data packet is applied to input preprocessing unit 200 from either input port IA1 or IB1 (determined depending on the path to be tested) of FIG. 15.

Referring to FIG. 16, input port determining unit 210 makes determination from which input port the data packet is applied, and sets the value of input port determination signal 218 to "0" or "1" according to the result thereof.

Because the H register reference bit of the data packet is "1", H register reference bit identification unit 212 provides the data packet to H register reference bit identifying unit 234 of output postprocessing unit 202 shown in FIG. 17 via test data packet transmission path 220.

H register reference bit identifying unit 234 sets the H register reference bit result signal to "1" because the H register reference bit is "1". The data packet is applied to output port selecting unit 238 via instruction identifying unit 236.

Because the instruction code is not an H register content specifying instruction, instruction identifying unit 236 sets identification result signal 246 to "0".

According to the fourth row in Table 5, output port selecting unit 238 refers to the contents of H register 204, and provides the data packet to output port OA1 and output port OB1 when the value stored in H register 204 is "0" and "1", respectively.

When the value of the H register reference bit of the data packet is "1", the branching destination of the data packet is determined depending on only the content of H register 204, irrespective of the contents of the data packet. Therefore, by using a data packet of an arbitrary bit pattern, the data packet can be transmitted via an arbitrary transmission path. Similar to the first embodiment, the packet transmission path between processors for testing can be set arbitrarily. Furthermore, the contents of the data packet is not referred to or updated. Thus, verification of paths connection between processors which was conventionally difficult or partially impossible can be carried out easily.

[Embodiment 3]

Figure 18:
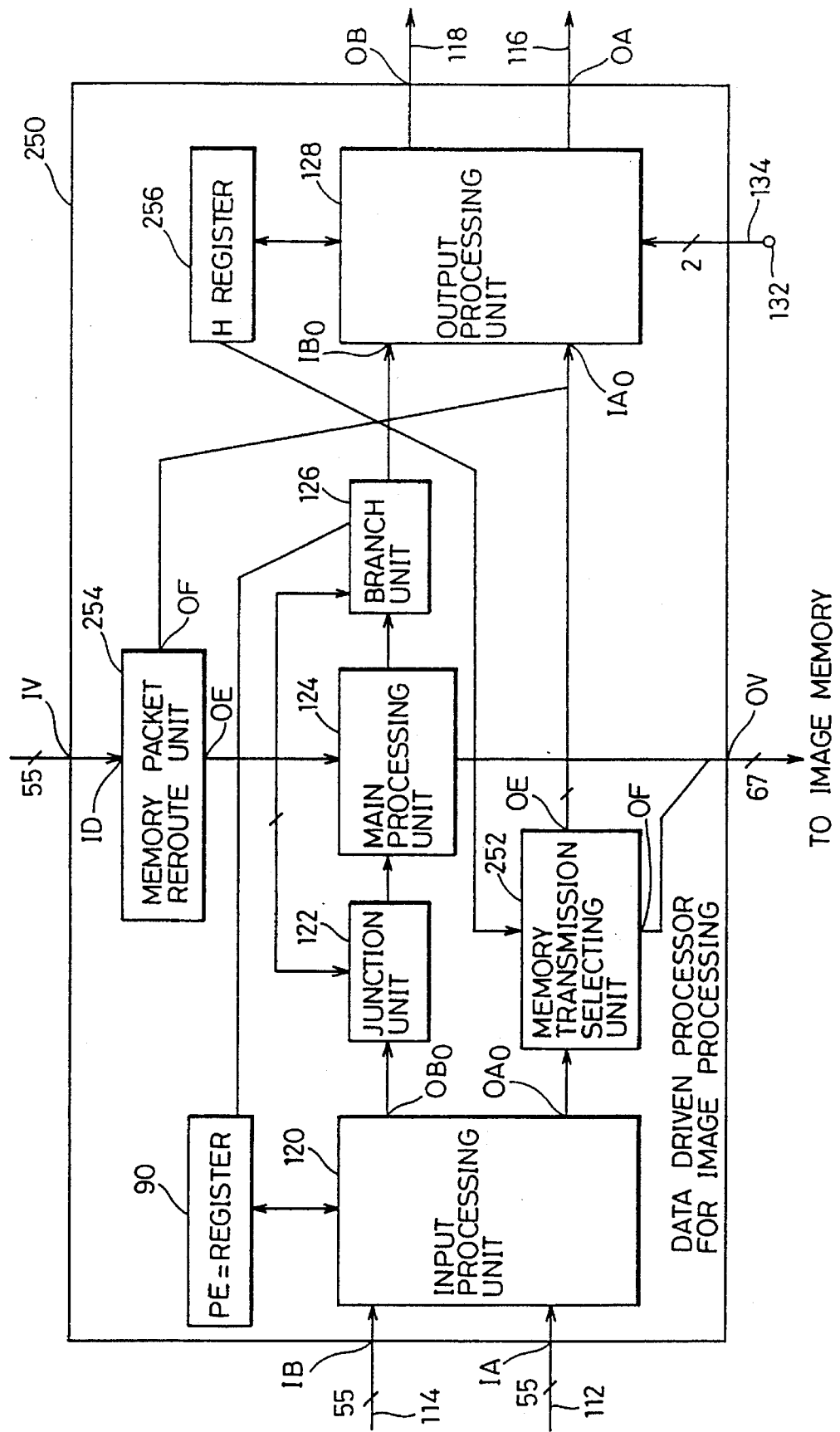
FIG. 18 is a block diagram showing a data driven processor for image processing according to a third embodiment of the present invention.

FIG. 18 is a block diagram of a data driven processor for image processing according to a third embodiment of the present invention. A data driven processor 250 of FIG. 18 can carry out verification of a path connection irrespective of the bit patterns of a data packet except for a path verification flag for data transmission paths to an image memory and from an image memory to processor 250.

Processor 250 of FIG. 18 differs from the data driven processor 110 of FIG. 8 in that an H register 256 of 2 bits is provided instead of H register 130 of 1 bit of FIG. 8, and a memory transmission selecting unit 252, and a memory packet reroute unit 244 are provided. Memory transmission selecting unit 252 serving as second output processing means includes an input connected to output OA0 of input processing unit 120, an output connected to one input IA0 of output processing unit 128, and an output connected to output port OV to an image memory. Memory transmission selecting unit 252 is connected to an H register 256 to refer to the value of the path verification flag of the entered data packet and the most significant bit of the output destination information stored in H register 256 to select output processing unit 128 or output port OV for providing a data packet. Memory packet reroute unit 254 serving as second input processing means includes an input connected to input port IV of an image memory, two input connected to one input IA0 of main body processing unit 124 and output processing unit 128 for selectively providing an input data packet to output selecting unit 128 or main processing unit 124 according to path verification flag in the input data packet.

In FIG. 18, components corresponding to those in FIG. 8 have the same reference character and name denoted. The function of each component is also identical. Therefore, details thereof will not be repeated. The least significant bit of the two bits of output destination information stored in H register 256 is similar to the output destination information stored in H register 130 of FIG. 8. Output processing unit 128 carries out an operation shown in Tables 1–5 according to the least significant bit of this output destination information. Only the most significant bit of the output destination information stored in H register 256 is referred to by memory transmission selecting unit 252.

Figure 19:
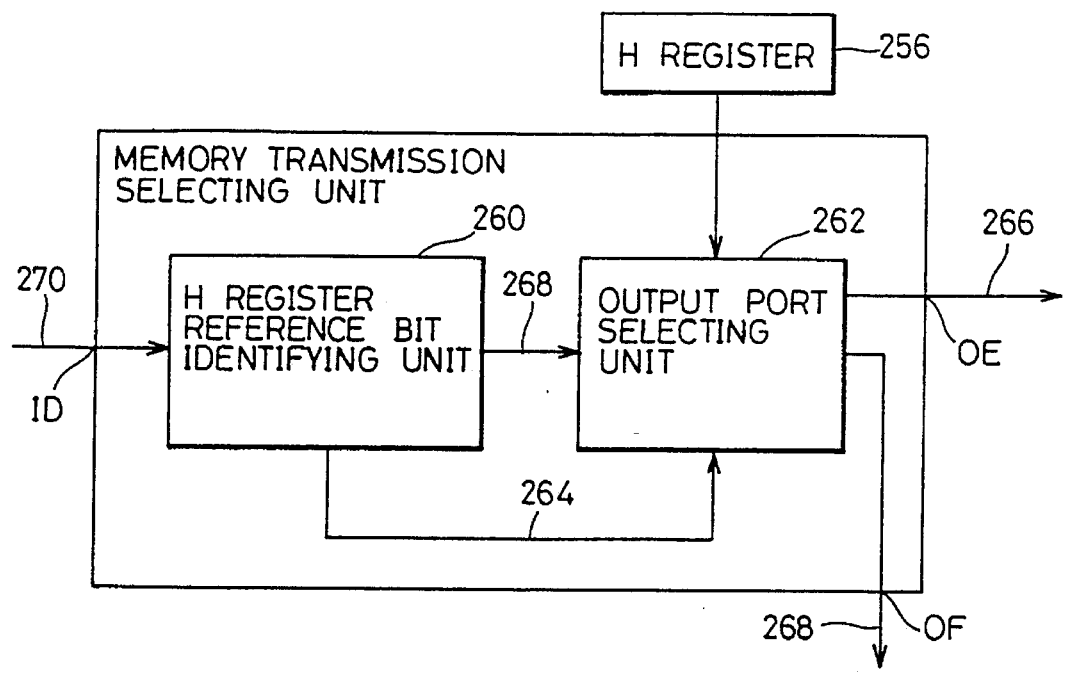
FIG. 19 is a block diagram of a memory transmission selecting unit according to the third embodiment.

Referring to FIG. 19, memory transmission selecting unit 252 includes an input port ID, and two output ports OE and OF. Input port ID is connected to data packet output OA0 of input processing unit 120 via data transmission path 270. Output port OE is connected to data packet input IA0 of output processing unit 128 of FIG. 18 via data transmission path 266. Output port OF is connected to output port OV of FIG. 18 via data transmission path 268.

Memory transmission selecting unit 252 further includes an H register reference bit identification unit 260 and an output port selecting unit 262.

H register reference bit identifying unit 260 includes an input connected to input port ID and an output port connected to data packet transmission path 268. H register reference bit identifying unit 260 determines whether the H register reference bit of the data packet applied via input port ID is "0" or "1" to provide H register reference bit result signal 264 to output port selecting unit 262.

Output port selecting unit 262 includes a data packet input connected to data packet transmission path 268, and two data packet outputs connected to output ports OE and OF. The most significant bit of the output destination information from H register 256 and H register reference bit result signal 264 from H register reference bit identifying unit 260 are provided to output port selecting unit 262. Output port selecting unit 262 serves to select which of output ports OE and OF the data packet is to be output according to the most significant bit of the output destination information stored in H register 256 and H register reference bit result signal 256, as shown in the following Table 6.

TABLE 6

| Most significant bit of H register | H register reference bit result signal 264 | Operation |
|---|---|---|
| 0 | 0 | Output packet to output processing unit 128 via port OE |
| 0 | 1 | Output packet to output processing unit 128 via port OE |
| 1 | 0 | Output packet to output processing unit 128 via port OE |
| 1 | 1 | Output packet to image memory unit 12 via ports OF, OV |

Referring to Table 6, the data packet is not for path connection verification testing when H register reference bit result signal 264 is "0". Therefore, output port selecting unit 262 selects output port OE from which data packet is applied to output processing unit 128, irrespective of the value of the most significant bit in the H register. When H register reference bit result signal 264 is "1", this data packet is for path connection verification testing. Therefore, output port selecting unit 262 distributes a data packet according to the most significant bit of the H register. When the most significant bit of the H register is "0", output port selecting unit 262 provides the data packet to output processing unit 128 via output port OE. When the most significant bit of the H register is "1", output port selecting unit 262 provides the data packet to image memory unit 12 via output ports OF and OV (refer to FIG. 18).

In summary, a data packet having an H register reference bit of "0" is applied to output processing unit 128 irrespective of the stored contents of the H register. If the H register reference bit is "1", the output destination of the data packet is determined according to the most significant bit of the H register. The destination is output processing unit 128 if the MSB is "0", and the output destination is image memory unit 12 if the MSB is "1". By providing a memory transmission selecting unit 252, a data packet can be provided on a transmission path 268 to image memory unit 12 irrespective of the bit patterns of the data packet except for the H register reference bit.

After a data packet is output to image memory unit 12, a data packet from image memory unit 12 must be received by processor 250 to be output to a subsequent processor. Memory packet reroute unit 254 is provided for this purpose.

Figure 20:
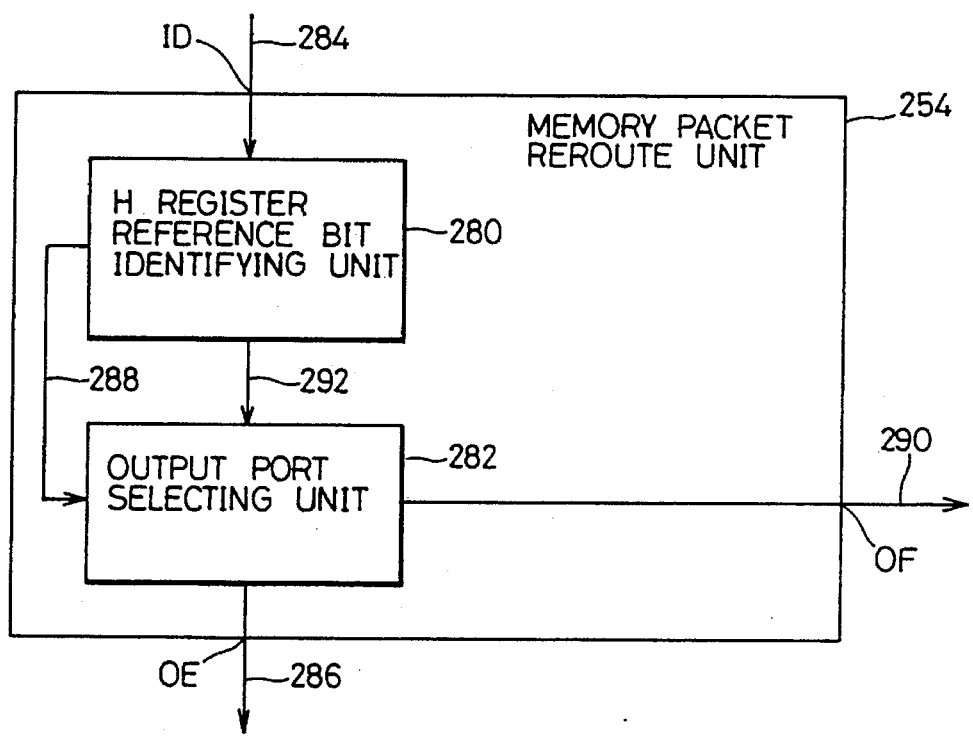
FIG. 20 is a block diagram of a memory packet reroute unit according to the third embodiment.

Referring to FIG. 20, memory packet reroute unit 254 includes an input port ID connected to data packet transmission path 284 from image memory unit 12, an output port OE connected to data packet transmission path 286, and an output port OF connected to data packet transmission path 290. Data packet transmission path 286 is connected to the data packet input of the image memory unit of main processing unit 124. Data packet transmission 290 is connected to input IA0 of output processing unit 128, with the output from memory transmission selecting unit 252.

Memory packet reroute unit 254 includes an H register reference bit identifying unit 280 having a data packet input connected to input port ID and a data packet output connected to data packet transmission path 292, and an output port selecting unit 282 having a data packet input connected to output transmission path 292 and two data packet outputs connected to output ports OE and OF. An H register reference bit result signal 286 is provided to output port selecting unit 282 from H register reference bit identifying unit 280.

H register reference bit identifying unit 280 looks into the H register reference bit of the data packet applied from input port ID to apply H register reference bit result signal 288 indicated by that value to output port selecting unit 282. The data packet is provided to output port selecting unit 282 from H register reference bit identifying unit 280 via data packet transmission path 292.

Output port selecting unit 282 determines that the data packet is a data packet for testing the path connection between a processor and an image memory when H register reference bit result signal 288 is "1". This data packet is applied to output processing unit 128 via output port OF. When H register reference bit result signal 288 is "0", output port selecting unit 282 determines that the data packet is one for normal processing, and provides the data packet to main processing unit 124 (refer to FIG. 18) via output port OE.

An operation of the data processor of the third embodiment shown in FIGS. 18–20 will be described hereinafter. Although operation thereof includes (1) PE# register specification, (2) normal processing, (3) H register specification, and (4) path connection verification processing, (1) PE# register specification and (3) H register specification are similar to those of the first embodiment, and their details will not be repeated here. In the following, (2) normal processing, and (4) path connection verification processing will be described.

(2) Normal processing

In normal processing, signal 134 from HBID terminal 132 shown in FIG. 18 is set to "00", as in the first embodiment.

Referring to FIG. 12, H register reference bit 192 of data packet 190 has "0" stored. Similar to the first embodiment, instruction code 62, generation number 64, first data 66 and processor number 68 have stored an instruction code, a generation number, and data to be calculated, and the processor number of the processor of interest, respectively.

The operation of input processing unit 120 is similar to that of the first embodiment. More specifically, the data packet is provided to output OB0 if the value of the processor number in PE# register 90 allocated to this data driven processor 250 and the value in processor number 68 (refer to FIG. 12) in the data packet match. Otherwise, the data packet is provided to output OA0.

The process carried out when the values of data processor number 68 of the data packet and the contents of PE# register 90 match is similar to that of the first embodiment. Therefore, detailed description thereof will not be repeated here.

When the value of processor number 68 of the data packet and the value of PE# register 90 do not match, memory transmission selecting unit 252 operates as follows. Referring to FIG. 19, H register reference bit identifying unit 260 refers to the H register reference bit of the applied data packet. H register reference bit result signal 264 is set to "0" and "1" when the H register reference bit is "0" and "1", respectively. H register reference bit identifying unit 260 provides the data packet to output port selecting unit 262 via data packet transmission path 268. The H register reference bit is set to "0" when in a normal processing. Therefore, the value of H register reference bit result signal 264 is also "0".

Because H register reference bit result signal 264 is "0", output port selecting unit 262 provides the data packet to output processing unit 128 via output port OE. The process preceding output processing unit 128 is similar to that of the first embodiment.

When the values of PE# register 90 and processor number 68 match and a data packet is applied to main processing unit 124 shown in FIG. 18, a data packet may be generated requiring access to image memory 12, which is applied to image memory unit 12. In this case, the resultant data packet is returned to data driven processor 250 via input port IV of FIG. 18. In this case, memory packet reroute unit 254 carries out the following operation.

Referring to FIG. 20, H register reference bit identifying unit 280 refers to the H register reference bit of the input data packet to determine the value of H register reference bit result signal 288. In normal processing, this value is "0". H register reference bit identifying unit 280 provides the data packet from data packet transmission path 284 to output port selecting unit 282.

Because H register reference bit result signal 288 is "0", output port selecting unit 282 provides the data packet to main processing unit 124 (FIG. 18) via output port OE. Main processing unit 124 processes the applied data packet, which is provided to branch unit 126 (refer to FIG. 18). The succeeding process is similar to that of the normal processing in the first embodiment.

(4) Path connection verification

Verification of path connection in the data driven processor of the third embodiment is carried out as set forth in the following. The procedure for verification is similar to that shown in FIG. 13.

In verifying a path connection, "10" or "11" is stored in H register 256 of FIG. 18. When the value is "10", verification of path connection of a path to an image memory or a path from an image memory is not carried out. When the value is "11", verification of path connection between data driven processor 250 and an image memory unit is carried out. The H register reference bit is set to "1" in the data packet applied to data driven processor 250.

Referring to FIG. 18, input processing unit 120 provides the data packet to memory transmission selecting unit 252 via output OA0 because the H register reference bit of the data packet is "1".

Referring to FIG. 19, H register reference bit identifying unit 260 provides the input data packet to output port selecting unit 262. H register reference bit identifying unit 260 refers to the H register reference bit of the input data packet. Because the value thereof is "1", H register reference bit result signal 264 is set to "1".

Output port selecting unit 262 carries out an operation according to Table 4 on the basis of the most significant bit in the output destination information stored in H register 256 and the value of H register reference bit result signal 264. More specifically, because the most significant bit of the H register is "1", the data packet is provided to image memory unit 12 via output port OF and OV.

When a data packet is applied to image memory unit 12, a resultant data packet with respect to the applied data packet is returned to input port IV of data driven processor 250 of FIG. 18. This data packet is processed as set forth in the following by memory packet reroute unit 254.

Referring to FIG. 20, H register reference bit identifying unit 280 sets H register reference bit result signal 288 to "1" because the H register reference bit of the entered data packet is "1". Therefore, output port selecting unit 282 applies the data packet provided from H register reference bit identifying unit 280 to output processing unit 128 via output port OF. It is to be noted that the data packet may be directly applied to output port selecting unit 282 without passing through H register reference bit identifying unit 280. Output processing unit 128 selects either output port OA or OB according to the least significant one bit of the stored contents of H register 256 to provide the data packet therefrom. The operation of output processing unit 128 is similar to that of the first embodiment shown in Tables 2–5. It is to be noted that only the least significant one bit of the stored contents of the H register is referred to.

According to the third embodiment, information of whether to provide a data packet to the path towards the image memory unit or to the path from the image memory unit is stored in the most significant bit of H register 256. In the least significant bit thereof, information specifying to which port the data packet for testing is to be output is stored. Thus, by providing a data packet having "1" stored in the H register reference bit to the data driven processor, verification of path connection of a desired path including a path towards an image memory unit or a path therefrom can be carried out.

The operation of data driven processor 250 according to the value of HBID signal 134 provided from HBID terminal 132 is similar to that of the first embodiment, and their description will not be repeated here.

Figure 24:
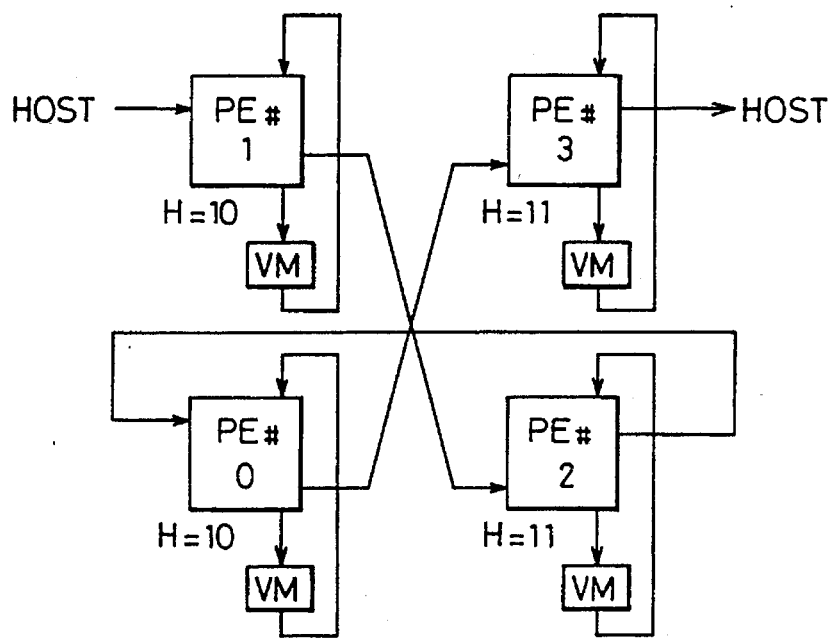

FIG. 24 shows an example of a test path in the case of a network system of FIG. 4 formed using the third embodiment.

Figure 21:
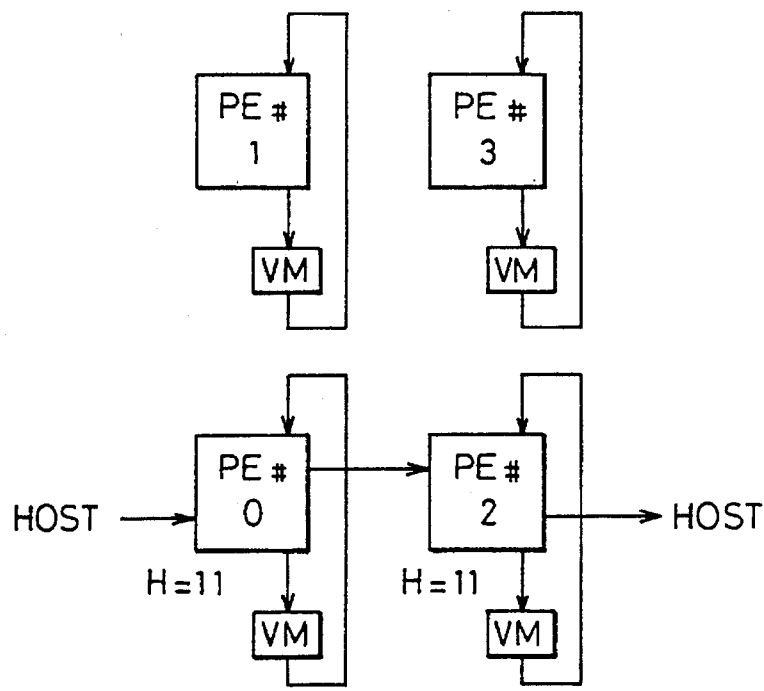
FIG. 21 is a diagram showing an example of processor connection configuration in a system including four of the data driven processors for image processing according to the third embodiment.

FIG. 21 shows a test path where the data packet is transmitted through processors PE#0 and PE#2. The value of the H register of processor PE#0 is preset to "11", and the value of the H register of processor PE#2 is preset to "10". The most significant bits in both H registers are "1". By applying a data packet with "1" in the H register reference bit to input port IA of processor PE#0 from the host computer, the connection path of: (1) host→processor PE#0→processor #2→host; and (2) between each processor and an image memory unit belonging to each processor can be verified easily, irrespective of the bit patterns of the input data packet. The actual path through which the data packet passes is in the order of: host→processor PE#0→image memory unit belonging to processor PE#0→processor PE#0→processor PE#2→image memory unit belonging to processor PE#2→processor PE#2→host computer.

Figure 22:
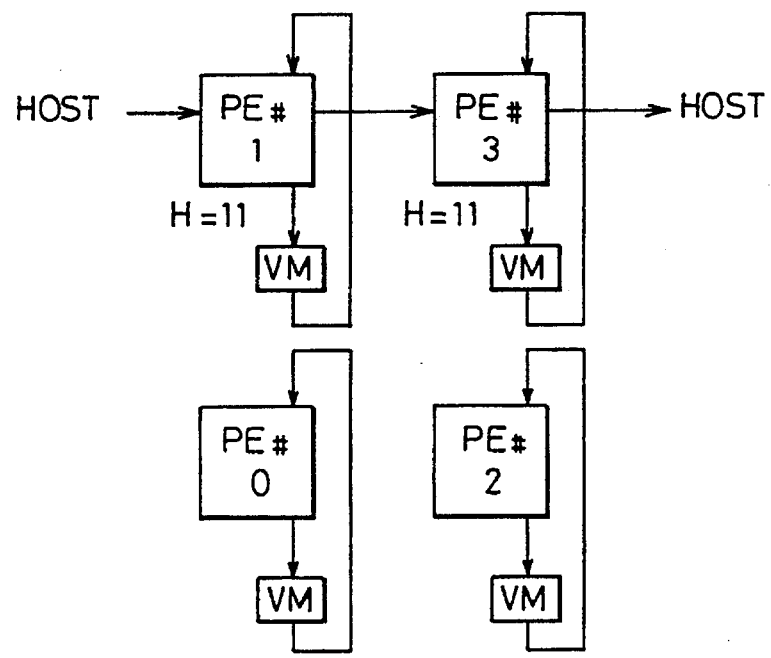
FIG. 22, 23, and 24 show other processor connections of the system shown in FIG. 21 respectively.

The test path shown in FIG. 22 is formed by storing "11" in each H register of processors PE#1 and PE#3. By such a path, connection can be verified of a transmission path of a host computer, processor PE#1, processor PE#3, and a host computer, including the transmission paths between processors and image memory units belonging to these processors.

Figure 23:
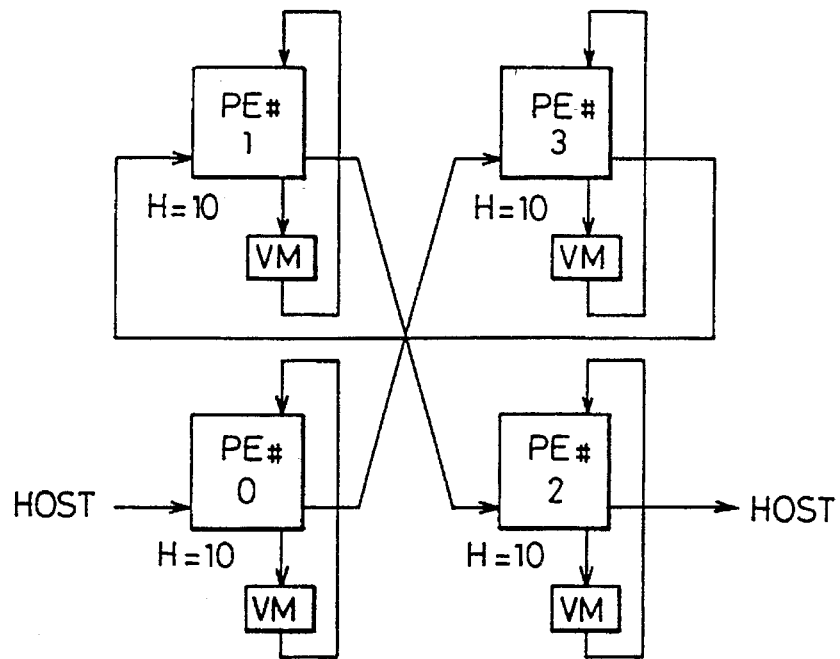

The data packet transmission path shown in FIG. 23 is established by storing "10" in all the H registers of processors PE#0, PE#1, PE#2, and PE#3. In this case, the data packet is transmitted from a host computer to another host computer through the path of PE#0, PE#3, PE#1, and PE#2. Furthermore, the path connections between processors and image memory units can also be verified.

FIG. 24 shows a test path when "10", "10", "11" and "11" are stored in respective H registers of processors PE#0, PE#1, PE#2, and PE#3, respectively. By applying a data packet to input port IV of processor PE#1, the data packet is transmitted in the order of processors PE#1, PE#2, PE#0, PE#3, and a host computer. In each processor, a data packet is provided to the image memory unit belonging to that processor, and a data packet is provided from that image memory unit to the corresponding processor, and then provided to the next processor. Therefore, path connections between processors and respective image memory units can be verified as well as the transmission paths between processors.

By setting four types of test paths as shown in FIGS. 21–24, verification of all transmission path connections of a system as formed in FIG. 4 can be carried out. The transmission path of a data packet can be specified irrespective of the contents of the data packet except for the H register reference bit. A path can be specified irrespective of an instruction code, and the contents of the data packet is not changed. Therefore, verification of a path connection which was impossible or difficult in a conventional method can be carried out easily.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven processor, adapted to operate in a network of interconnected data paths, comprising:

an input port and at least two output ports, output destination information memory means for storing output destination information specifying an output port from which a data packet is output in path verification testing;

disable means for selectively disabling instruction execution, by the data driven processor such that only a state of a path verification flag in the data packet can be changed, of an instruction held in an instruction field of the data packet, as a function of the state of the path verification flag in the data packet, regardless of the nature of the instruction held by the instruction field;

selective output means, connected to said input port, for selectively providing an input data packet to one of said output ports according to the path verification flag and destination information included in said input data packet and according to said output destination information in said output destination information memory means, when instruction execution is disabled.

2. The data driven processor according to claim 1, comprising a plurality of said output ports, wherein said selective output means comprises input processing means including an input connected to said input port, and first and second outputs, for selectively providing an input data packet to one of said first and second outputs according to a path verification flag and a destination information included in said input data packet, data packet processing means including an input connected to said first output of said input processing means, for carrying out processing according to information included in an applied data packet for generating if necessary an output data packet including information for specifying an output port, and output processing means including two inputs connected to an output of said data packet processing means and said second output of said input processing means, and a plurality of outputs connected to said plurality of output ports respectively, and connected to said output destination information memory means for selectively referring to one of said output destination information and said destination information included in an input data packet according to the value of a path verification flag of said entered data packet to select one of said plurality of output ports for providing a data packet.

3. The data driven processor according to claim 2, comprising a first said input port and a second said input port, wherein said input processing means comprises means including two inputs connected to said first and second input ports respectively, for selectively providing an input data packet to one of said first and second outputs according to a path verification flag and destination information included in said input data packet.

4. The data driven processor according to claim 3, comprising a first said input port, and a second said input port connected to an output of a predetermined memory device, and a first said output port, and a second said output port connected to an input of said predetermined memory device, wherein said selective output means comprises first input processing means including an input connected to said first input port, and first and second outputs, for selectively providing an input data packet to one of said first and second outputs according to a path verification flag and destination information included in said input data packet, second input processing means including an input connected to said second input port and first and second outputs, for selectively providing an input data packet to one of said first and second outputs according to a path verification flag included in said entered data packet, data packet processing means including two inputs connected to said first output of said first input processing means and said first output of said second input processing means, and a first output connected to said second output port, and a second output, for carrying out processing according to information included in an input data packet, for generating if necessary an output data packet including destination information and selectively providing the same to said first output or said second output, first output processing means including an input connected to said second output of said first input processing means, a first output connected to said second output port, and a second output, and connected to said output destination information memory means, for selectively providing a data packet to said first output or said second output according to a value of a path verification flag and said output destination information of an entered data packet, and second output processing means including a first input connected in common to said second output of said data packet processing means and said second output of said second input processing means, a second input connected to said second output of said first output processing means, and two outputs connected to said first and second output ports, and connected to said output destination information memory means, for referring to a path verification flag of an input data packet and said output destination information for selecting one of said first and second output ports for providing a data packet.

5. The data driven processor according to claim 4, comprising a plurality of said first input ports.

6. The data driven processor according to claim 3, comprising a plurality of said first output ports.

7. The data driven processor according to claim 4, comprising a plurality of said first output ports.

8. The data driven processor according to claim 5, comprising a plurality of said first output ports.

9. A data driven information processing device comprising:

a plurality of data driven processors, and connection means for connecting said plurality of data driven processors to each other such that any two processors can be connected at least indirectly, wherein each of said plurality of data driven processors comprises an input port and at least two output ports, output destination information memory means for storing output destination information specifying an output port from which a data packet is to be output in path verification testing, disable means for selectively disabling instruction execution, by the data driven processor such that only a state of a path verification flag in the data packet is changed, of an instruction held in an instruction field of the data packet, as a function of the state of the verification flag in the data packet, regardless of the nature of the instruction held by the instruction field; and selective output means, connected to said input port, for selectively providing an input data packet to one of said output ports according to the path verification flag and destination information included in said data packet and according to said output destination information, when instruction execution is disabled, wherein said connection means comprises a plurality of data transmission paths for connecting said input port of said plurality of data driven processors to an output port of another of said data driven processors.

10. The data driven information processing device according to claim 9, further comprising a plurality of memory devices, wherein said connection means further comprises a plurality of data transmission paths for connecting said plurality of data driven processors with said plurality of memory devices respectively.

11. A method of verifying a path connection of a plurality of data driven processors, said method comprising the steps of:

a) selectively disabling instruction execution, by a data driven processor in which the data packet temporarily resides such that only a state of a path verification flag in the data packet can be changed, of an instruction held by an instruction field in the data packet, as a function of the state of the path verification flag, regardless of the nature of the instructions;

b) specifying output destination information providing a desired transmission path to an output destination information memory means of each of said plurality of data driven processors;

c) applying a data packet having a value indicating path verification testing, specified as said path verification flag, to an input port of the first of said data driven processors in said desired transmission path;

d) verifying whether a datapacket properly corresponding to an applied data packet is provided to an output port of the last of said data driven processors in said desired transmission path; and e) repeating said path specification step, said data packet applying step, and said verification step by varying said desired transmission path.

12. A method of verifying a path connection between a plurality of data driven processors and a plurality of memory devices, said method comprising the steps of:

a) selectively disabling instruction execution, by a data driven processor in which the data packet temporarily resides such that only a state of a path verification flag in the data packet can be changed, of an instruction held by an instruction field in the data packet, as a function of the state of the path verification flag, regardless of the nature of the instruction;

b) specifying output destination information providing a desired transmission path that passes through at least one of said plurality of memory devices;

c) applying a data packet having a value indicating path verification testing, specified as said path verification flag, to an input port of the first of said data driven processors in said desired transmission path;

d) verifying whether a data packet properly corresponding to an applied data packet is provided to an output port of the last of said data driven processors in said desired transmission path; and e) repeating said path specification step, said data packet applying step, and said verification step by varying said desired transmission path.

* * * * *